(12) United States Patent
Lewis et al.

(10) Patent No.: US 11,892,845 B2
(45) Date of Patent: Feb. 6, 2024

(54) SYSTEM AND METHOD FOR MISSION PLANNING AND FLIGHT AUTOMATION FOR UNMANNED AIRCRAFT

(71) Applicant: Insurance Services Office, Inc., Jersey City, NJ (US)

(72) Inventors: Jeffery D. Lewis, Orem, UT (US);
Jeffrey C. Taylor, Alpine, UT (US);
Corey D. Reed, Cedar Hills, UT (US);
Troy Tomkinson, Saratoga Springs, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 17/443,761

(22) Filed: Jul. 27, 2021

(65) Prior Publication Data

US 2021/0356963 A1 Nov. 18, 2021

Related U.S. Application Data

(63) Continuation of application No. 15/995,048, filed on May 31, 2018, now Pat. No. 11,073,830.
(Continued)

(51) Int. Cl.
*G06F 17/00* (2019.01)
*G05D 1/00* (2006.01)
(Continued)

(52) U.S. Cl.
CPC ......... *G05D 1/0094* (2013.01); *B64C 39/024* (2013.01); *G05D 1/0061* (2013.01);
(Continued)

(58) Field of Classification Search
CPC .... G05D 1/0094; G05D 1/0061; G05D 1/042; B64C 39/024; G06V 20/13; G06V 20/17;
(Continued)

(56) References Cited

U.S. PATENT DOCUMENTS 5,706,011 A    1/1998 Huss et al.
2010/0198514 A1  8/2010 Miralles
(Continued)

FOREIGN PATENT DOCUMENTS

AU    2017206097 A1    4/2018
AU    2020200652 A1    2/2020
(Continued)

OTHER PUBLICATIONS

UAV Path Planning Based on Improved Artificial Potential Field Method (Year: 2023).*
(Continued)

*Primary Examiner* — Ronnie M Mancho
(74) *Attorney, Agent, or Firm* — McCarter & English, LLP

(57) ABSTRACT

A system and method for mission planning and flight automation for an unmanned aircraft comprising generating an aerial imagery map of a capture area; generating a flight plan based on criteria for capturing images used to create a model of a feature present in the images; comparing the generated aerial imagery map with the generated flight plan; determining whether there is a possible collision between an obstacle associated with the generated aerial imagery map and the unmanned aircraft along a flight path of the generated flight plan; and executing, based on the determination, the generated flight plan.

20 Claims, 21 Drawing Sheets

Related U.S. Application Data

(60) Provisional application No. 62/512,989, filed on May 31, 2017.

(51) Int. Cl.

| | | |
|---|---|---|
| *G08G 5/00* | (2006.01) | |
| *G08G 5/04* | (2006.01) | |
| *G05D 1/04* | (2006.01) | |
| *B64C 39/02* | (2023.01) | |
| *G06V 20/13* | (2022.01) | |
| *G06V 20/17* | (2022.01) | |
| *B64U 101/30* | (2023.01) | |

(52) U.S. Cl.
CPC .............. *G05D 1/042* (2013.01); *G06V 20/13* (2022.01); *G06V 20/17* (2022.01); *G08G 5/006* (2013.01); *G08G 5/0021* (2013.01); *G08G 5/0034* (2013.01); *G08G 5/0039* (2013.01); *G08G 5/0069* (2013.01); *G08G 5/0086* (2013.01); *G08G 5/045* (2013.01); *B64U 2101/30* (2023.01); *B64U 2201/10* (2023.01); *B64U 2201/20* (2023.01)

(58) Field of Classification Search
CPC .. G08G 5/0021; G08G 5/0034; G08G 5/0039; G08G 5/006; G08G 5/0069; G08G 5/0086; G08G 5/045; B64U 2101/30; B64U 2201/10; B64U 2201/20
USPC ............................................................ 701/5
See application file for complete search history.

(56) References Cited

U.S. PATENT DOCUMENTS

| | | | |
|---|---|---|---|
| 2011/0118928 A1 | 5/2011 | Yoo et al. | |
| 2011/0234425 A1 | 9/2011 | Germanetti et al. | |
| 2015/0226575 A1 | 8/2015 | Rambo | |
| 2016/0210863 A1 | 7/2016 | Kohn-Rich | |
| 2016/0313736 A1* | 10/2016 | Schultz ................ | G08G 5/0069 |
| 2017/0057634 A1 | 3/2017 | Hunt et al. | |
| 2017/0069214 A1 | 3/2017 | Dupray et al. | |
| 2017/0110014 A1 | 4/2017 | Teng et al. | |
| 2017/0134631 A1 | 5/2017 | Zhao et al. | |
| 2017/0192420 A1 | 7/2017 | Wang et al. | |
| 2017/0199647 A1 | 7/2017 | Richman et al. | |
| 2017/0206414 A1 | 7/2017 | Schultz et al. | |
| 2018/0003161 A1 | 1/2018 | Michini et al. | |
| 2018/0003656 A1 | 1/2018 | Michini et al. | |
| 2018/0025473 A1* | 1/2018 | Contreras .............. | G06V 20/64 |
| | | | 348/144 |
| 2018/0046187 A1* | 2/2018 | Martirosyan ........... | G06T 7/292 |
| 2018/0111683 A1* | 4/2018 | Di Benedetto ...... | G06Q 10/083 |
| 2018/0233054 A1* | 8/2018 | Woon .................... | G08G 5/0056 |
| 2018/0348766 A1 | 12/2018 | Lewis et al. | |
| 2019/0019418 A1* | 1/2019 | Tantardini ............ | G08G 5/0069 |
| 2019/0066317 A1 | 2/2019 | Chang et al. | |
| 2019/0147749 A1 | 5/2019 | Lewis et al. | |

FOREIGN PATENT DOCUMENTS

| | | | |
|---|---|---|---|
| EP | 3092625 A1 | 11/2016 | |
| EP | 3391164 A1 | 10/2018 | |
| EP | 3435188 A1 | 1/2019 | |

OTHER PUBLICATIONS

Office Action dated Jul. 13, 2022, issued in connection with U.S. Appl. No. 16/189,389 (41 pages).
International Search Report and Written Opinion of the International Searching Authority dated Aug. 31, 2018, issued in connection with International Application No. PCT/US2018/35504 (9 pages).
International Search Report and Written Opinion of the International Searching Authority dated Feb. 4, 2019, issued in connection with International Application No. PCT/US2018/060746 (7 pages).
Office Action dated Jul. 24, 2020, issued in connection with U.S. Appl. No. 16/189,389 (39 pages).
Office Action dated Sep. 2, 2020, issued in connection with U.S. Appl. No. 15/995,048 (18 pages).
Partial Supplementary European Search Report dated Jan. 22, 2021, issued by the European Patent Office in connection with European Patent Application No. 18810471.5 (14 pages).
Notice of Allowance dated Mar. 22, 2021, issued in connection with U.S. Appl. No. 15/995,048 (8 pages).
Extended European Search Report dated Apr. 23, 2021, issued by the European Patent Office in connection with European Patent Application No. 18810471.5 (12 pages).
Office Action dated Apr. 26, 2021, issued in connection with U.S. Appl. No. 16/189,389 (46 pages).
Extended European Search Report dated Dec. 15, 2021, issued by the European Patent Office in connection with European Patent Application No. 18876438.5 (15 pages).
Communication Pursuant to Article 94(3) EPC dated Feb. 17, 2022, issued by the European Patent Office in connection with European Patent Application No. 18810471.5 (10 pages).
Invitation Pursuant to Rule 63(a) dated Jul. 20, 2021, issued by the European Patent Office in connection with European Patent Application No. 18876438.5 (7 pages).
Office Action dated Mar. 30, 2023, issued in connection with U.S. Appl. No. 16/189,389 (42 pages).
Summons to Attend Oral Proceedings Pursuant to Rule 115(1) Epc dated Apr. 20, 2023, issued by the European Patent Office in connection with European Patent Application No. 18810471.5 (11 pages).
Office Action dated Jun. 22, 2023, issued by the Canadian Patent Office in connection with Canadian Patent Application No. 3,065,503 (4 pages).
Communication Pursuant to Article 94(3) EPC dated Jul. 31, 2023, issued by the European Patent Office in connection with European Patent Application No. 18876438.5 (11 pages).
Examination Report No. 1 dated Sep. 26, 2023, issued by the Australian Patent Office in connection with Australian Patent Application No. 2018364811 (3 pages).
Office Action dated Nov. 8, 2023, issued by the Canadian Patent Office in connection with Canadian Patent Application No. 3,065,503 (4 pages).

\* cited by examiner

SYSTEM AND METHOD FOR MISSION PLANNING AND FLIGHT AUTOMATION FOR UNMANNED AIRCRAFT

RELATED APPLICATIONS

This application is a continuation application of U.S. patent application Ser. No. 15/995,048 filed on May 31, 2018 (now issued U.S. Pat. No. 11,073,830), which claims priority to U.S. Provisional Patent Application Ser. No. 62/512,989 filed on May 31, 2017, the entire disclosures of which are expressly incorporated by reference herein.

BACKGROUND

Technical Field

The present disclosure relates generally to the field of unmanned aircraft technology. More specifically, the present disclosure relates to a system and method for flight planning and flight automation for unmanned aircraft.

RELATED ART

In the unmanned aircraft field, increasingly sophisticated software-based systems are being developed for flight planning and flight automation. Such systems have wide applicability, including but not limited to, navigation, videography and other fields of endeavor. In the field of aerial image processing, there is particular interest in the application of unmanned aircraft systems for automatically generating and executing a flight plan to capture required images to create a precise and comprehensive model of one or more desired features present in the images (e.g., generating models of buildings, other structures, portions and/or attributes of buildings/structures, property features, etc.).

There is currently significant interest in the unmanned aircraft field in developing systems that generate and execute a flight plan to capture images of structures and property present in such images with minimal user involvement. For example, it would be highly beneficial to develop systems that can automatically detect and avoid obstacles present in a flight path for capturing the images, requiring no (or, minimal) user involvement, and with a high degree of accuracy. Still further, there is a need for systems which can automatically generate and execute flight plans (for capturing images) which do not include any obstacles in the flight path. Accordingly, the system of the present disclosure addresses these and other needs.

SUMMARY

The present disclosure relates to a system and method for mission planning and flight automation for unmanned aircraft. The system includes at least one hardware processor including a controller configured to generate and execute a flight plan that automatically detects and avoids obstacles present in a flight path for capturing the images, requiring no (or, minimal) user involvement. The system can also include the ability to predict obstacles in flight paths, and automatically calculate a flight path that avoids predicted obstacles.

The system first loads an imagery map of the capture area from an imagery database. The imagery could include, but is not limited to, aerial imagery, LiDAR imagery, satellite imagery, etc. Alternatively, the system may generate a real time aerial imagery map. Then, the system generates a flight plan based on criteria to capture the required images to create a precise and comprehensive model of a desired feature (such as a structure, a portion or attribute of a structure, and/or property present in the images). The system then compares the aerial imagery map with the generated flight plan and determines whether there are possible collisions between obstacles associated with the aerial imagery map (e.g., trees, power lines, windmills, etc.) and the unmanned aircraft. If collisions are not present, the system executes the initial flight plan. If collisions are present, the system modifies the flight plan to avoid the obstacles and executes the modified flight plan.

BRIEF DESCRIPTION OF THE DRAWINGS

The foregoing features of the present disclosure will be apparent from the following Detailed Description of the Invention, taken in connection with the accompanying drawings, in which.

DETAILED DESCRIPTION

The present disclosure relates to a system and method for mission planning and flight automation for unmanned aircraft, as described in detail below in connection with FIGS. 1-19.

Figure 1:
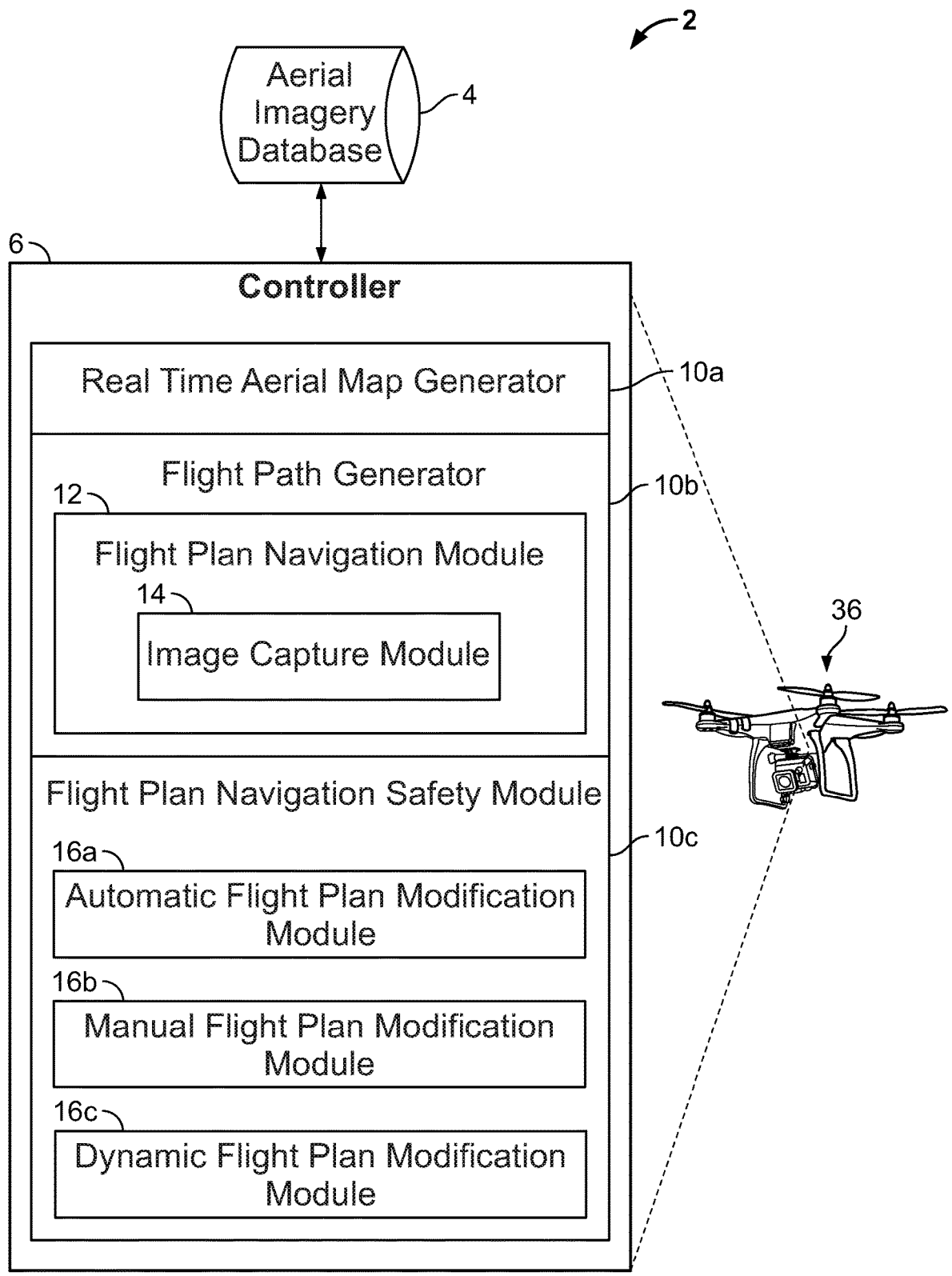
FIG. 1 is a diagram illustrating hardware and software components capable of being utilized to implement the system of the present disclosure.

Turning to the drawings, FIG. 1 is a diagram illustrating hardware and software components capable of implementing the system of the present disclosure. The system could be embodied as a central processing unit (e.g. a hardware processor) of an unmanned aircraft 36 coupled to an aerial imagery database 4. In another embodiment the system could be embodied as the unmanned aircraft 36. The hardware processor includes a controller 6 that is configured to generate and execute a flight plan, requiring no (or, minimal) user involvement, that automatically detects and avoids obstacles present in a flight path. Alternatively, the system could be embodied as unmanned aircraft system code (non-transitory, computer-readable instructions) stored on a computer-readable medium and executable by the hardware processor.

The controller 6 could include various modules that carry out the steps/processes discussed herein, and could include, but is not limited to, a real time aerial map generator 10a, a flight path generator 10b and a flight plan navigation safety module 10c. The flight path generator 10b could further include a flight plan navigation module 12 and an image capture module 14. The flight plan navigation safety module 10c could further include an automatic flight plan modification module 16a, a manual flight plan modification module 16b and a dynamic flight plan modification module 16c.

The hardware processor could also include, but is not limited to, a personal computer, a laptop computer, a tablet computer, a smart telephone, a server, and/or a cloud-based computing platform. Further, the code could be distributed across multiple computer systems communicating with each other over a communications network, and/or stored and executed on a cloud computing platform and remotely accessed by a computer system in communication with the cloud platform. The code could communicate with the aerial imagery database 4, which could be stored on the same computer system as the code or on one or more other computer systems in communication with the code.

Figure 2:
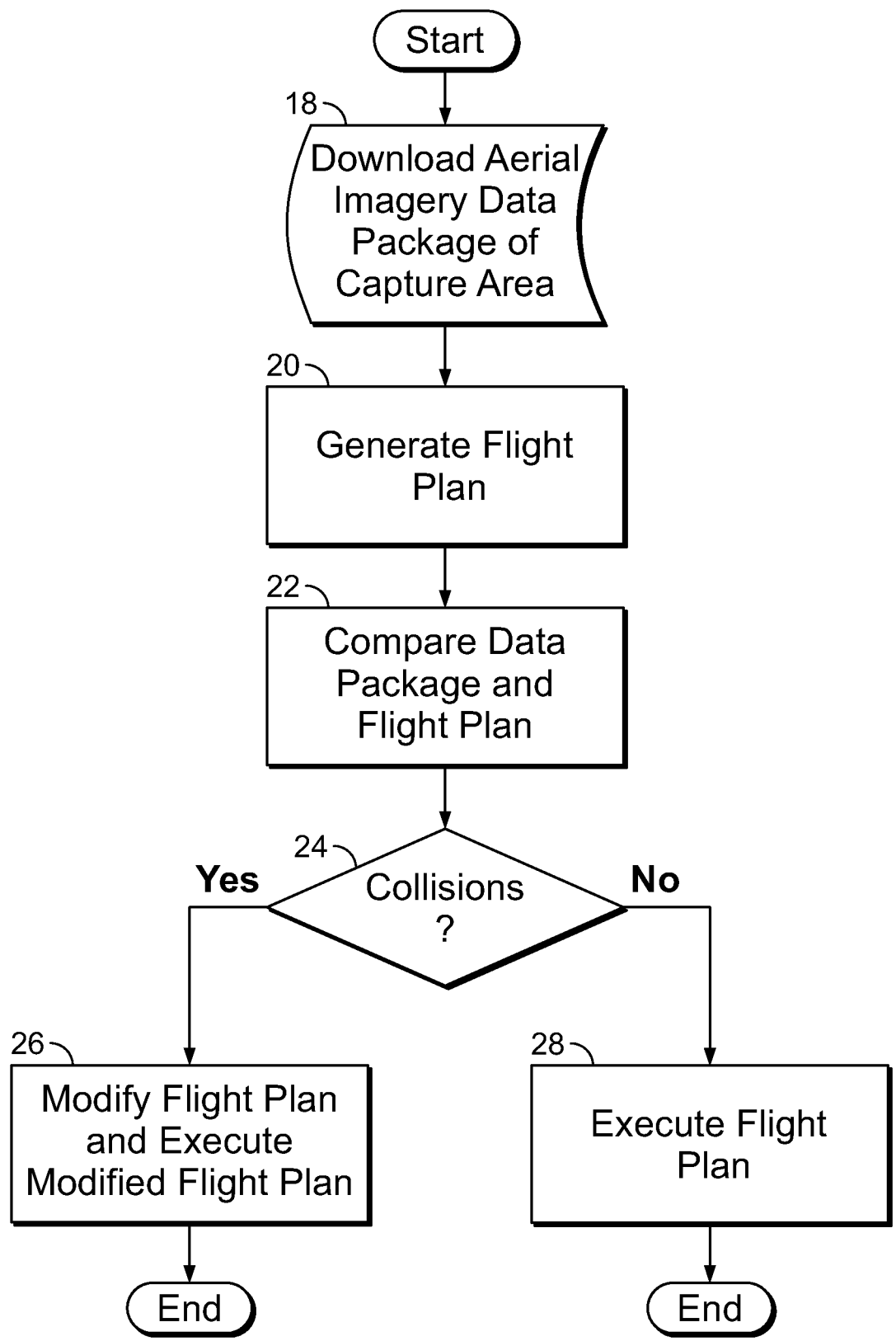
FIG. 2 is a flowchart illustrating processing steps carried out by the system of the present disclosure.

FIG. 2 is a flowchart illustrating processing steps carried out by the controller 6 of FIG. 1. The system of the present disclosure allows for the rapid generation, modification and execution of a flight plan to capture required images to create a precise and comprehensive model of a structure and property present in the images. The images could include aerial images taken from various angles including, but not limited to, nadir views, oblique views, etc.

Beginning in step 18, the system downloads an aerial image data package of the area to be captured. The data package could be a pre-existing digital terrain model (DTM) including, but not limited to, flight path obstacles such as residential and commercial buildings, flagpoles, water towers, windmills, street lamps, trees, power lines, etc. Alternatively, the real time aerial map generator 10a of FIG. 1 could generate a real time DTM. The capture area could be identified by any suitable identifier, such as postal address, latitude and longitude coordinates, Global Positioning System (GPS) coordinates, or any other suitable identifier. Then, in step 20, the system generates an initial flight plan. The initial flight plan could be generated based on a field of view of a camera attached to the unmanned aircraft, a height of the structure to be captured, and a footprint of the structure to be captured.

In step 22, the system checks for possible collisions between the unmanned aircraft and the obstacles in the capture area by comparing the aerial image data package and the initial flight plan. If the system determines that there are collisions in step 24, then in step 26, the system modifies the initial flight plan and executes the modified flight plan to avoid the obstacles while capturing the images to create the model of the structure and property present in the images. If the system determines there are no collisions (or, potential collisions) in step 24, then in step 28, the system executes the initial flight plan. It is noted that the system can also automatically generate and execute flight plans for capturing images using a variety of flight paths of various shapes, directions, etc. An example of a flight path in accordance with the present invention is discussed hereinbelow in connection with FIGS. 5-19, but it is noted that the system of the present disclosure is not limited to the particular flight paths disclosed herein.

Figure 3:
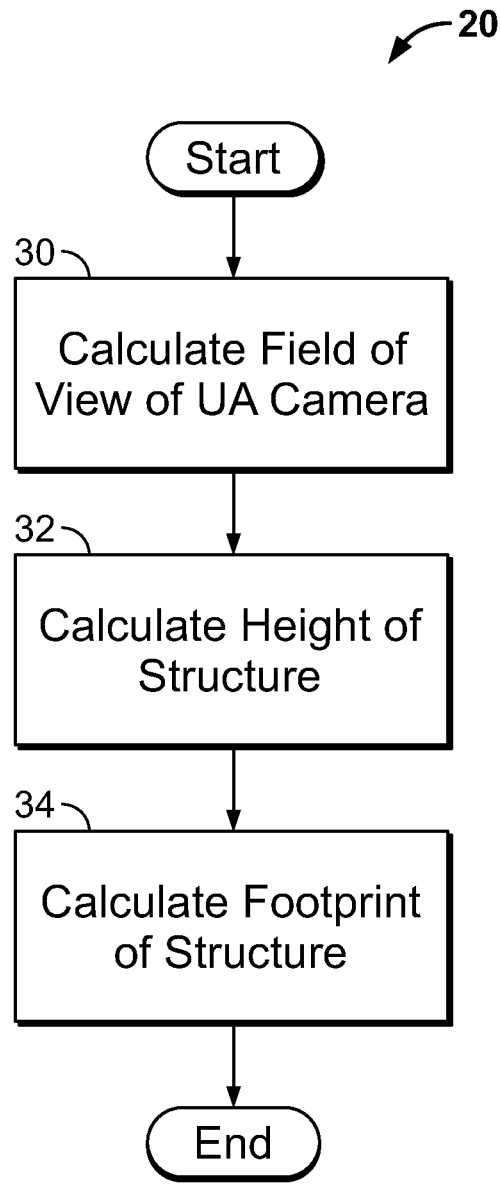
FIG. 3 is a flowchart illustrating step 20 of FIG. 2 in greater detail.

FIG. 3 is a flowchart illustrating, in greater detail, processing steps carried out by the system of the present disclosure in step 20 of FIG. 2. To generate the flight plan, the system calculates the field of view of the camera attached to the unmanned aircraft in step 30, calculates the height of the structure to be captured in step 32, and then calculates the footprint of the structure in step 34.

Figure 4A:
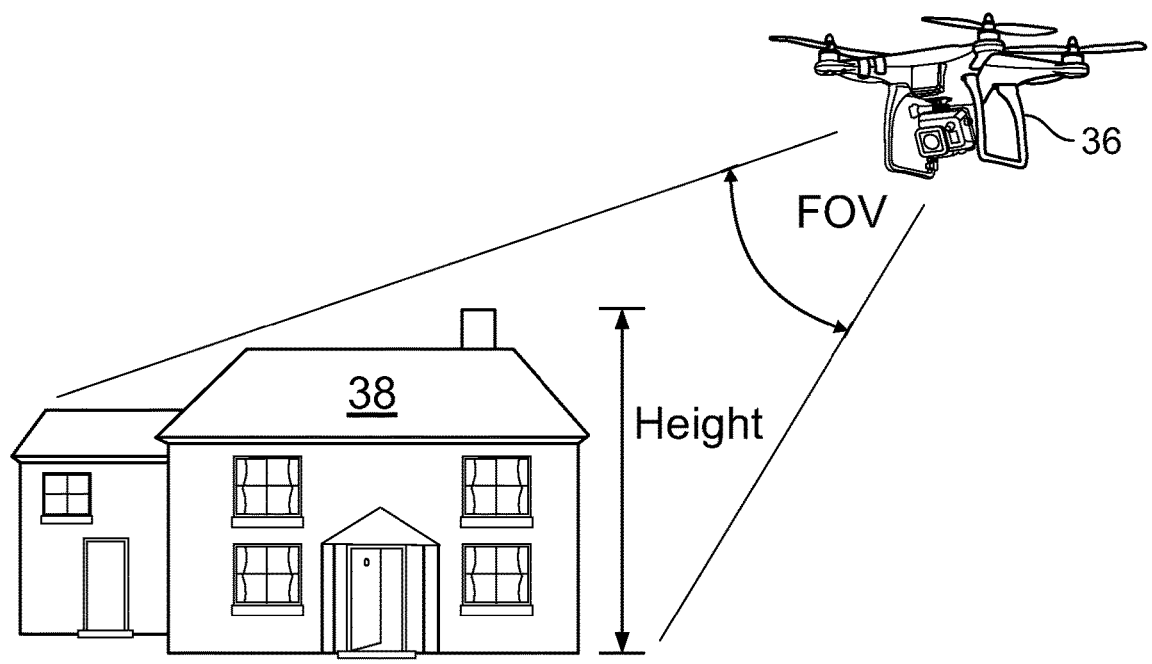
FIG. 4A is a diagram illustrating step 32 of FIG. 3.
Figure 4B:
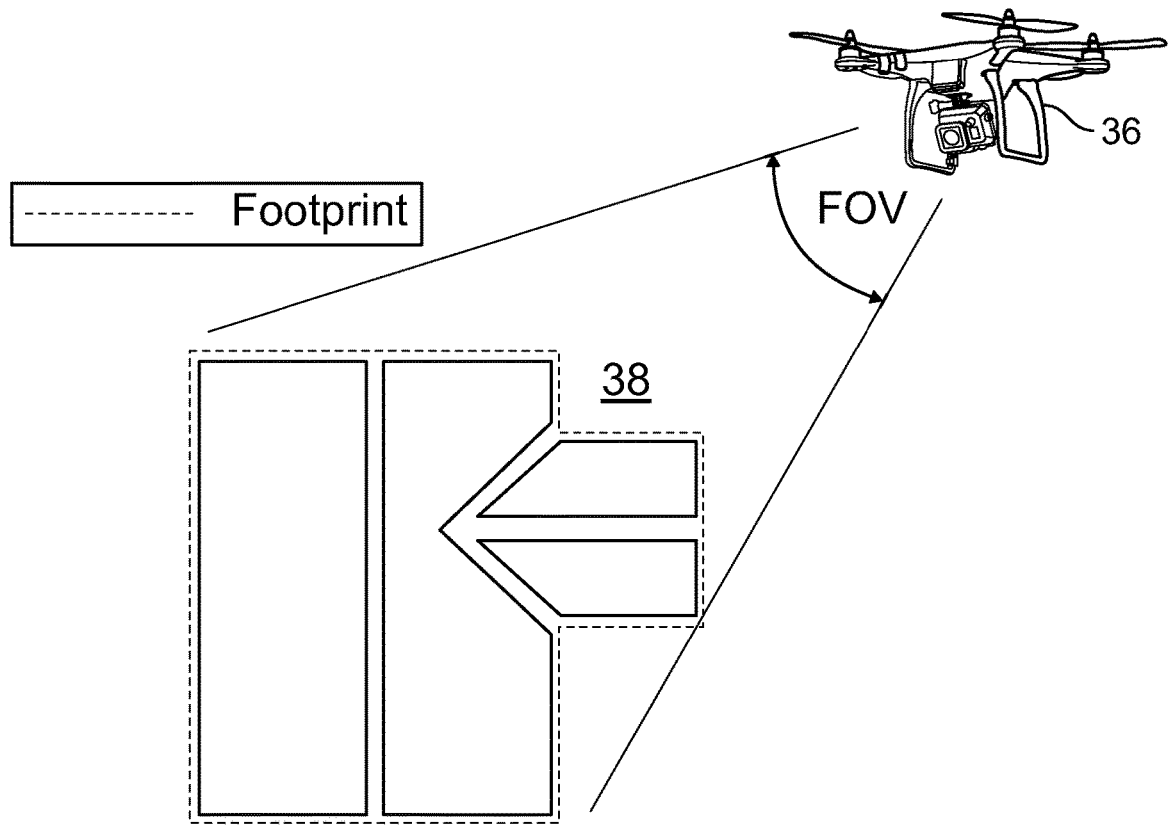
FIG. 4B is a diagram illustrating step 34 of FIG. 3.

FIGS. 4A-4B are images illustrating the processing steps of FIG. 3 carried out by the system of the present disclosure. As shown in FIG. 4A, the system begins by calculating the field of view of a camera attached to an unmanned aircraft 36 and the height of a structure 38 to be captured. As shown in FIG. 4B, the system then calculates the footprint of the structure 38 to be captured.

Figure 5:
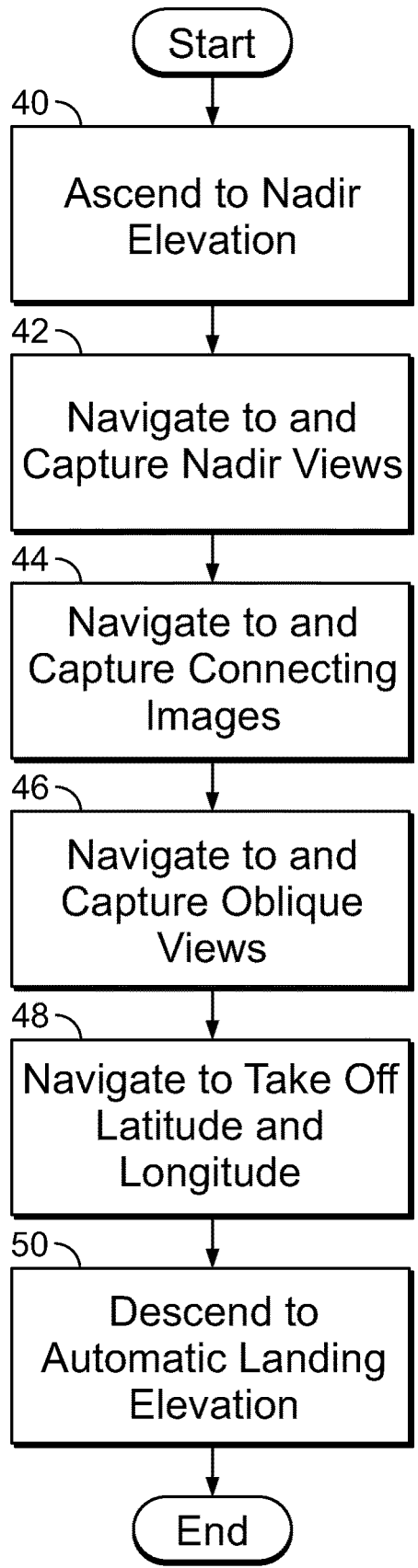
FIG. 5 is a flowchart illustrating process steps for generating a flight plan based on FIG. 3.

FIG. 5 is a flow chart illustrating processing steps carried out by the flight plan navigation module 12 of the system for generating a flight plan. Between take off and landing of the unmanned aircraft 36, there could be six components of a flight plan including, but not limited to: ascending to a nadir view elevation 40; navigating to and capturing at least one nadir view 42; navigating to and capturing connecting images 44; navigating to and capturing at least one oblique view 46; navigating to take off latitude and longitude 48; and descending to an automatic land elevation 50. As noted above, the system of the present disclosure is not limited to the particular flight paths disclosed and discussed herein, which are illustrative in nature. Indeed, the system could plan and automatically execute flight paths of other configurations, shapes, paths, etc. For example, the system could automatically plan and execute flight paths that are arcuate in shape (e.g., orthodromic arcs) or have other geometries (e.g., radial paths, straight flight paths, etc.).

The system calculates the elevation the unmanned aircraft 36 must ascend to before ascending to a nadir view elevation in step 40 and navigating to and capturing at least one nadir view in step 42. For example, the taller and larger a structure to be captured is, the higher the elevation a nadir view needs to be captured from in order to capture the entire structure. Similarly, the narrower a field of view of a camera attached to the unmanned aircraft 36, the higher the elevation required for a nadir view to be captured. If a nadir view is captured from an elevation that is inadequate (e.g. too low), a part or parts of the structure may be omitted from the captured image. Additionally, the system calculates a number of nadir views necessary to provide complete coverage of the structure.

To navigate to and capture connecting images in step 44, the system calculates the number of connecting images necessary to provide contiguous overlapping images as the unmanned aircraft 36 moves along the flight path from the nadir portion of the flight path to the obliques portion of the flight path. This is discussed below in reference to FIG. 7. Similarly, the system calculates the number of oblique views necessary to provide complete coverage of the structure 38 and navigates to and captures an image from each oblique view in step 46. For example, the taller and larger a structure 38 to be captured is, the greater the number of oblique views that are required to provide complete coverage of the structure 38. Likewise, the narrower a field of view of the camera attached to the unmanned aircraft 36, the greater the number of oblique views that are required to provide complete coverage of the structure 38.

In step 48, the unmanned aircraft 36 navigates to the take off latitude and longitude before descending in step 50 to an automatic landing elevation. To navigate to the take off latitude and longitude in step 48, the unmanned aircraft 36 requires the elevation of the first nadir view in step 40 so a flight path of the unmanned aircraft 36 avoids the structure 38 as it navigates to the take off latitude and longitude during step 48. Upon arriving at the take off latitude and longitude, the unmanned aircraft 36 descends from the first nadir view elevation in step 40 to an elevation of five meters before automatically landing.

It is noted that the system disclosed herein could optionally survey neighboring structures and take preliminary image captures of such neighboring structures before navigating the unmanned aircraft 36 to such neighboring structures. Such preliminary image captures could be taken during an initial pass to plan navigation to a neighboring structure and/or property (e.g., the system could take a preliminary image capture of a neighboring building so that the unmanned aircraft 36 can fly directly to the nadir image capture point above the neighboring building). In the event that the images of the neighboring structure are out of focus, the system may still be able to extract useful information from such images before navigating to the neighboring structure, and/or perform image correction on such images if needed.

Figure 6:
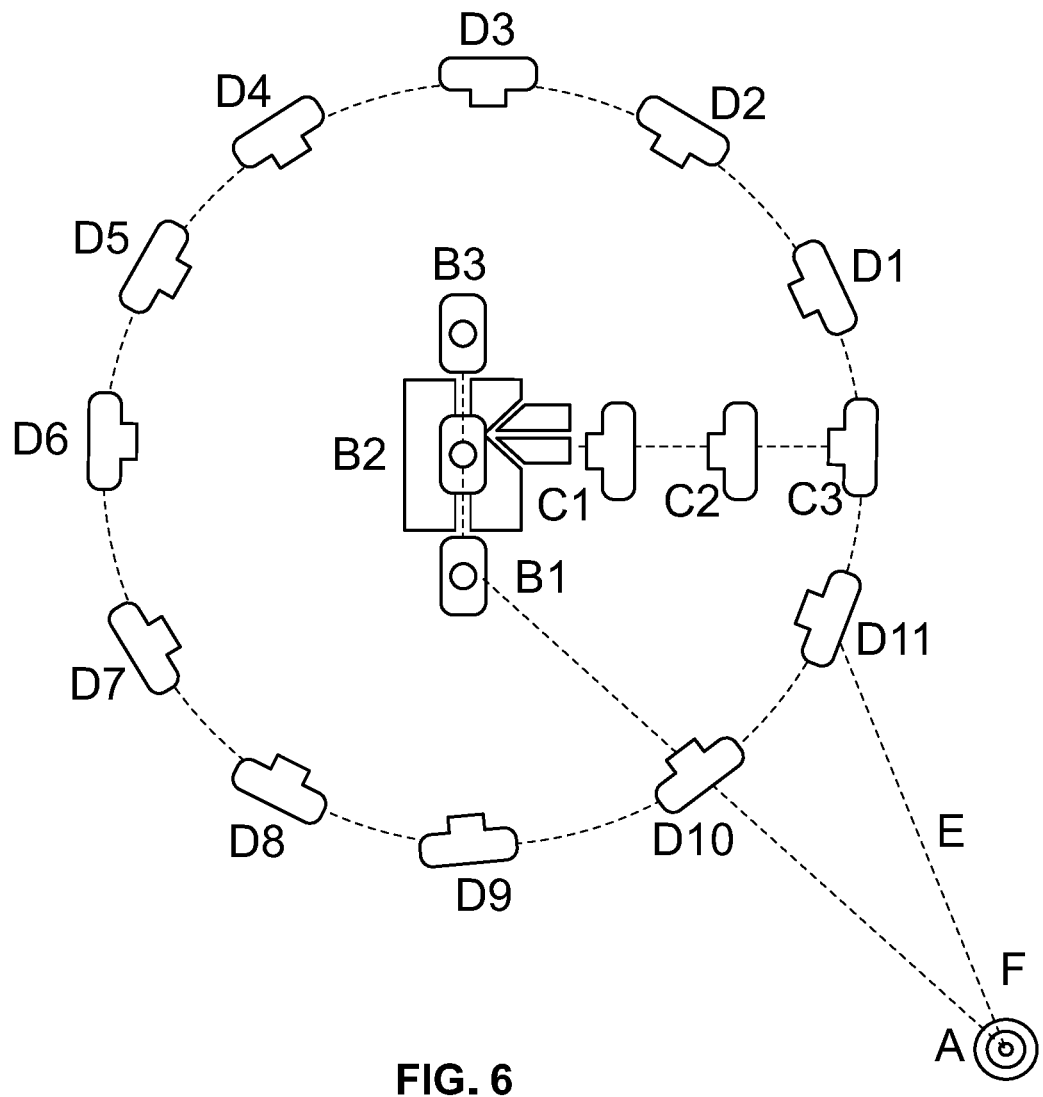
FIG. 6 is a diagram illustrating the processing steps of FIG. 5.

FIG. 6 is a diagram illustrating, as carried out by the processing steps of FIG. 5, generation of a flight plan and a flight path of the unmanned aircraft 36. As shown in FIG. 6, the unmanned aircraft 36 ascends to a nadir view elevation A before navigating to and capturing a first nadir view B1, a second nadir view B2 and a third nadir view B3. Subsequently, the unmanned aircraft 36 navigates to and captures connecting images C1, C2 and C3 before navigating to and capturing oblique views D1-11 in a counter clockwise fashion. Then the unmanned aircraft 36 navigates to the take off latitude and longitude at point E and upon arrival descends from the first nadir view elevation A to an elevation of five meters before automatically landing.

Figure 7:
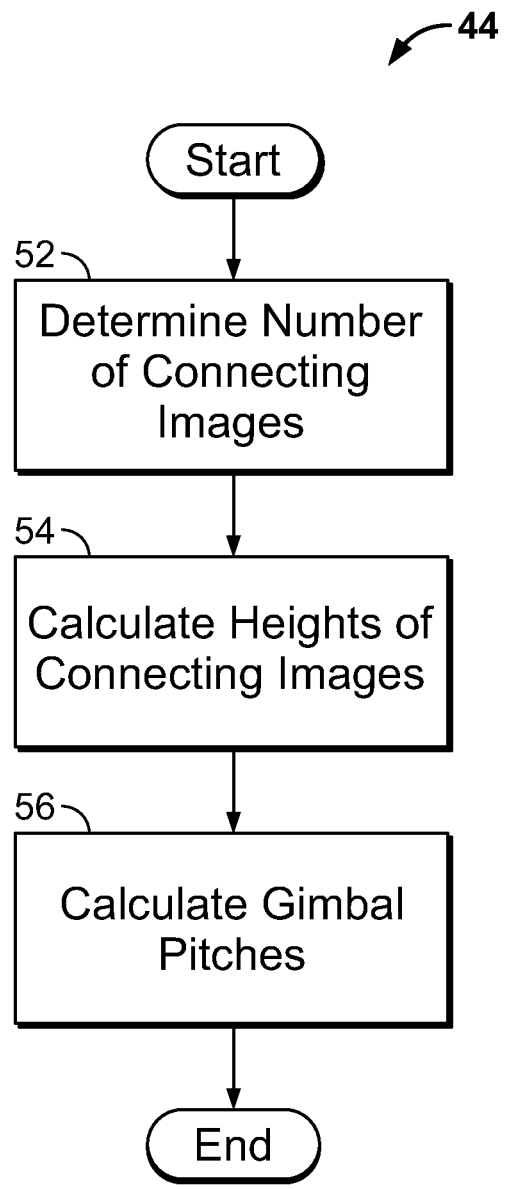
FIG. 7 is a flowchart illustrating step 44 of FIG. 5 in greater detail.

FIG. 7 is a flowchart illustrating step 44 of FIG. 5 in greater detail. The image capture module 14 of FIG. 1 can calculate a number of connecting images necessary to capture contiguous overlapping images between the nadir image capture portion of the flight path and the oblique image capture portion of the flight path. To determine the number of connecting images, the system calculates the flight path required to move the unmanned aircraft 36 from the last nadir image position to the first oblique image position in step 52, then calculates an elevation (height) and the longitude and latitude for each of the connecting images in step 54. The system can then calculate a gimbal pitch required for each of the connecting views in step 56. It is noted that the processing steps discussed herein in connection with FIG. 7 are illustrative in nature, and that the system could implement other image capture steps/techniques. For example, the system need not capture contiguous overlapping images of a structure in order to generate a model of the structure, and instead, could generate a model of the structure using a specified number of images taken from one or more predetermined viewing angles. Moreover, by the term "contiguous" images, it is meant two or more images of the structure that are taken at view angles such that one or more features of the structure/building are viewable in the two or more images.

Figure 8:
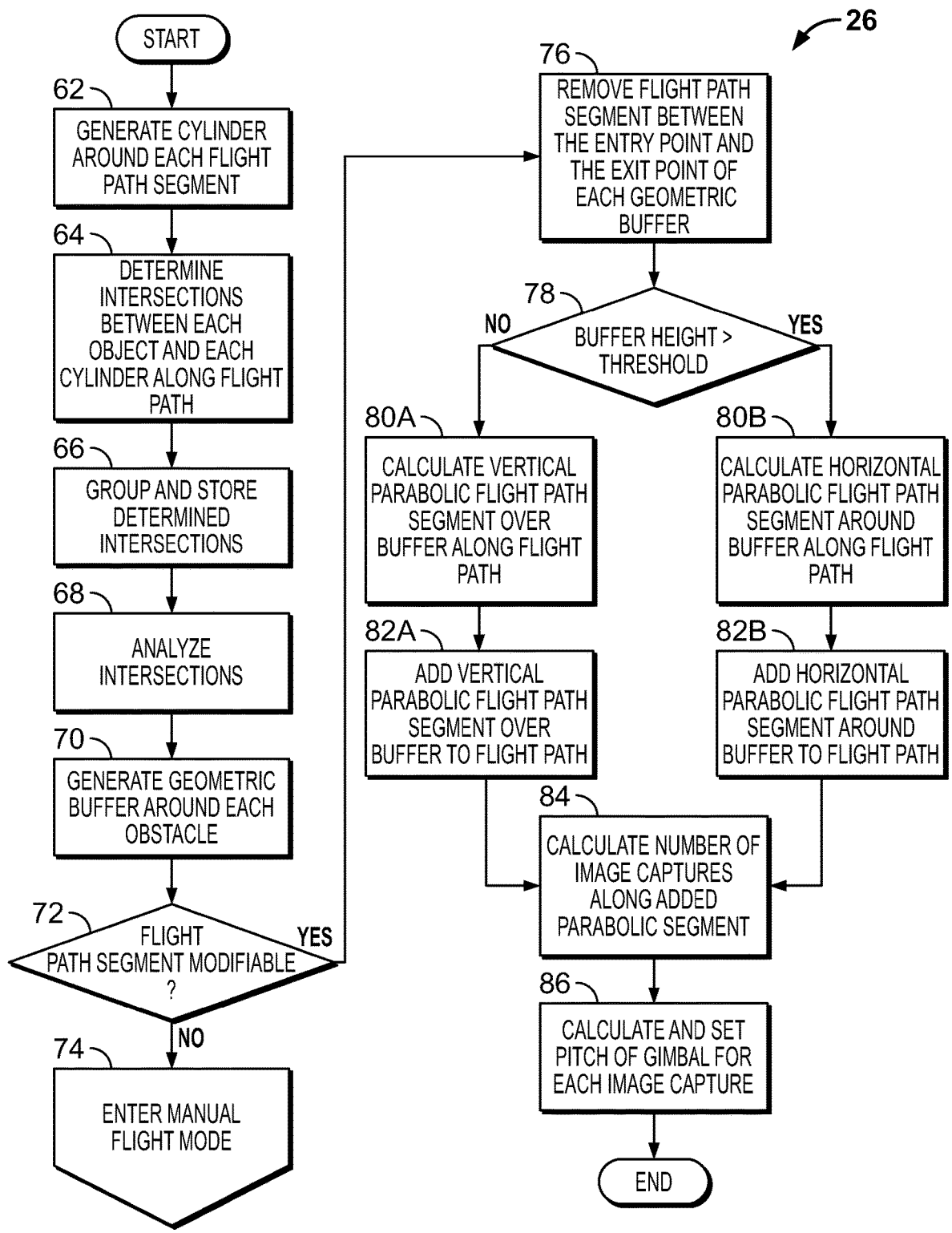
FIG. 8 is a flowchart illustrating step 26 of FIG. 2 in greater detail.

FIG. 8 is a flowchart illustrating step 26 of FIG. 2 in greater detail. Beginning in step 62, the system generates a spatial cylinder around each flight path segment (which is a straight path). Alternatively, the system may generate a spatial torus or section of a torus around each flight path segment (which is a circular path or an arced path, respectively). As noted herein, the flight paths described herein are illustrative in nature and are not limited in scope, and indeed, the system could implement flight paths of various other configurations/shapes/paths without departing from the spirit or scope of the present disclosure. In step 64, the system checks for intersections between each object represented in the downloaded data package and each cylinder, torus, or section of a torus along the flight path. Then in step 66, the system groups and stores the determined intersections first according to the object being intersected and then according to descending order of height (e.g., from highest elevation to lowest elevation). The grouping and storing of the intersections as an ordered collection of intersections allows the system to analyze the intersections together as a block. Therefore and if necessary, the system can modify the flight path in one pass while considering all intersections, rather than incrementally changing the flight path based on individual intersections. In step 68, each determined intersection is analyzed to determine if it can be handled together in a group with other intersections. Of course, the intersections need not be processed together as a block in order for the system to function.

In step 70, the system generates a geometrically-shaped buffer region (e.g., an ellipsoid, box (parallelepiped), cylinder, or other shape) around each obstacle present in the flight path. The geometric buffer envelopes the entire obstacle with an additional buffer space to ensure the flight path avoids the obstacle. Then and in step 72, the system determines whether the flight path segment affected by the obstacle may be automatically modified by the system. A flight segment may not be automatically modifiable if the obstacle is too tall or large for the unmanned aircraft to effectively avoid. Accordingly, in step 74, the system may enter a manual flight mode such that the flight path will include a manual section of flight directed by the pilot of the unmanned aircraft 36. Alternatively, if the system determines that the flight segment is modifiable, then the system, in step 76, removes all previous flight path segments between an entry point into the geometric buffer region and an exit point out of the buffer region. It is noted that the flight path modification could be executed by the system in real time, e.g., as the unmanned aircraft 36 is flying, or at any other time (e.g., before the flight path is executed).

In step 78, the system determines whether the height of the geometric buffer exceeds a predefined threshold. The threshold maybe a maximum elevation of the unmanned aircraft, a flight zone elevation restriction, etc. If the system determines that the height of the geometric buffer does not exceed the threshold, then the system in step 80a calculates a vertical parabolic flight path segment over the buffer area in the direction of the original flight path. Accordingly, the system in step 82*a* then adds the calculated vertical parabolic segment over the geometric buffer to the flight path.

Alternatively, if the system determines the height of the ellipsoid exceeds the predefined threshold, in step 80*b* the system calculates a horizontal parabolic flight path segment around the geometric buffer in the direction of the original flight path. The horizontal parabolic segment around the geometric buffer is calculated based on the intersection of the plane of the initial flight path and the geometric buffer. Therefore, the horizontal parabolic segment around the geometric buffer should be in the direction toward the structure 38. If the space between the ellipsoid and the structure 38 is insufficient to accommodate the unmanned aircraft 36, an alternate horizontal parabolic segment will be generated which is in the direction away from the structure 38. In either case, the system in step 82*b* then adds the calculated horizontal parabolic flight path segment around the geometric buffer to the flight path. In step 84, the system calculates a number of image captures along either the vertical parabolic segment over the geometric buffer or the horizontal parabolic segment around the geometric buffer. In step 86, the system calculates and sets a pitch of a gimbal of the unmanned aircraft for each image to capture the entire structure 38 (or, alternatively, for capturing a portion or feature of the structure, target feature, etc.).

Figure 9:
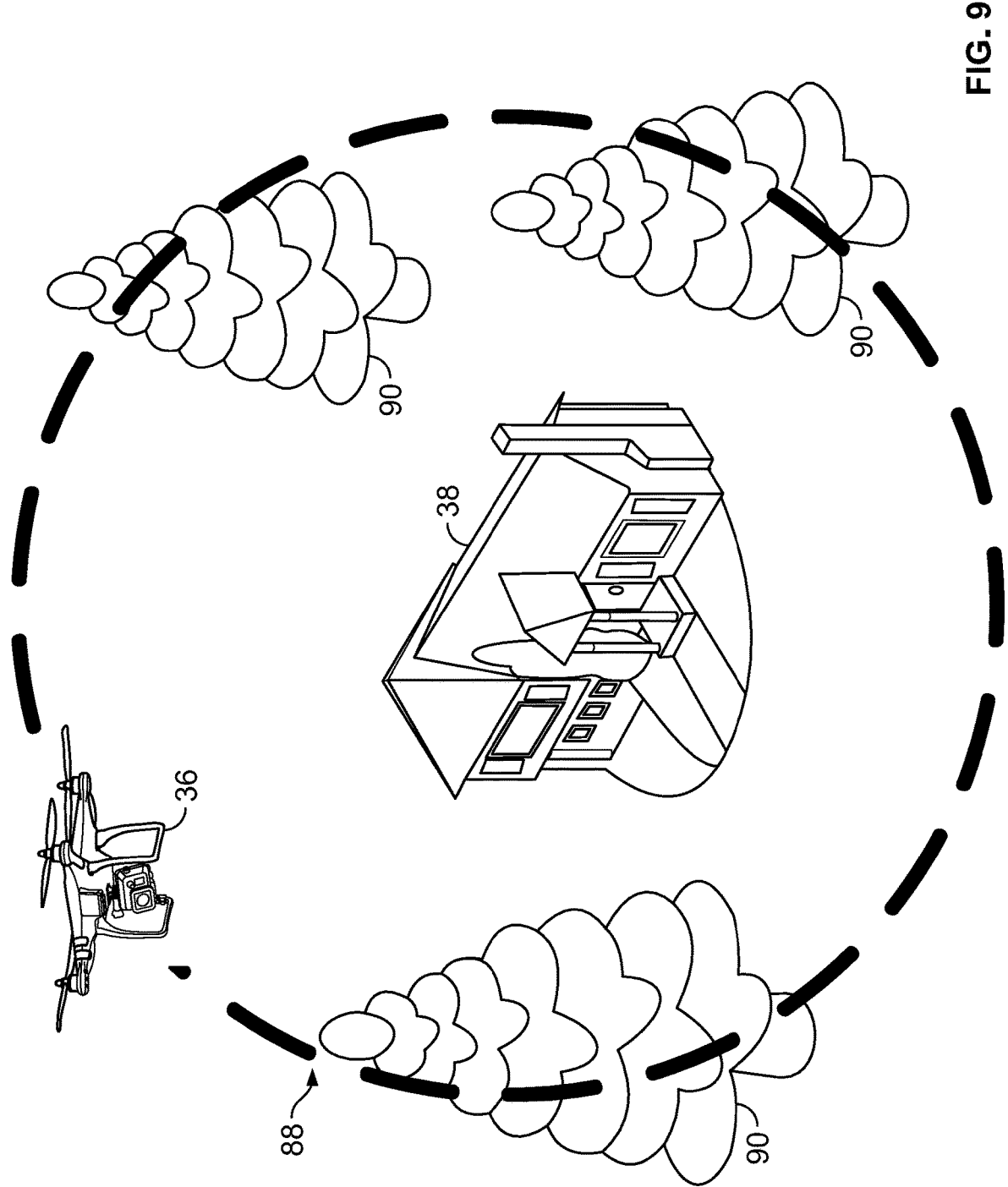
FIG. 9 is a diagram illustrating a flight path of a flight plan generated by the system.

FIG. 9 is a diagram illustrating a flight path of a generated flight plan. The initial flight plan is generated based on a field of view of a camera attached to the unmanned aircraft 36, a height of the structure 38 to be captured and a footprint of the structure 38 to be captured. In addition, the system checks for possible collisions between the unmanned aircraft 36 and obstacles 90 in the capture area by comparing the aerial image data package and the initial flight plan. As shown in FIG. 9, collisions may exist between the unmanned aircraft 36 and obstacles 90 such as trees along flight path segments 88, etc.

Figure 10:
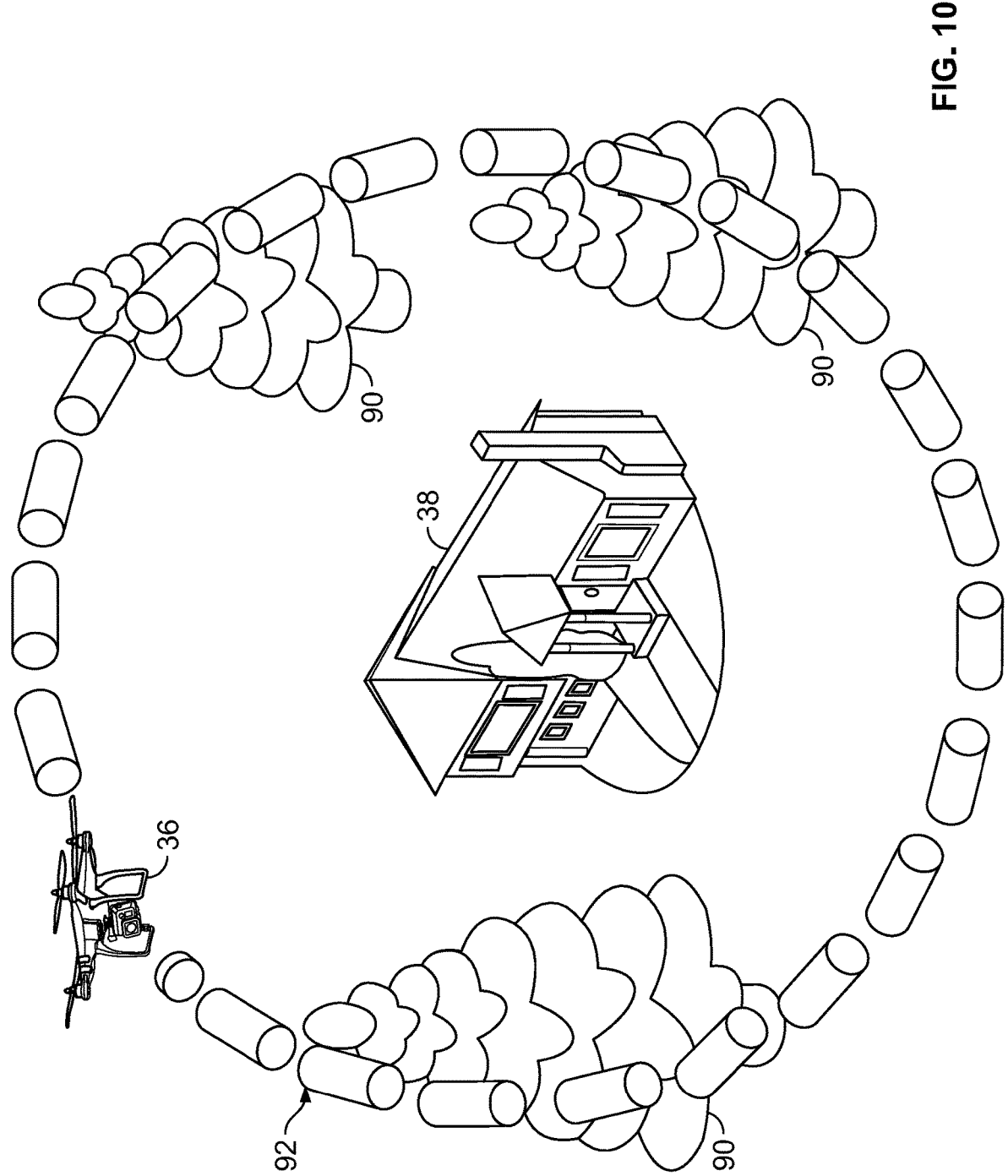
FIG. 10 is a diagram illustrating a flight path of a flight plan generated by the system according to step 62 of FIG. 8.

FIG. 10 is a diagram illustrating a flight path of a generated flight plan according to step 62 of FIG. 8. As noted above, in step 62, the system generates a cylinder 92 around each flight path segment 88 of FIG. 9. Alternatively, the system may generate a torus or section of a torus around each flight path segment 88 of FIG. 9. In step 64, the system checks for intersections between each obstacle 90 present in the flight path and each cylinder 92 along the flight path. It is noted that the size of each flight path segment 88 could be pre-defined (e.g., set to a fixed value), specified by a user in advance of (or, during) a flight, and/or dynamically modified as required (e.g., during a flight).

Figure 11:
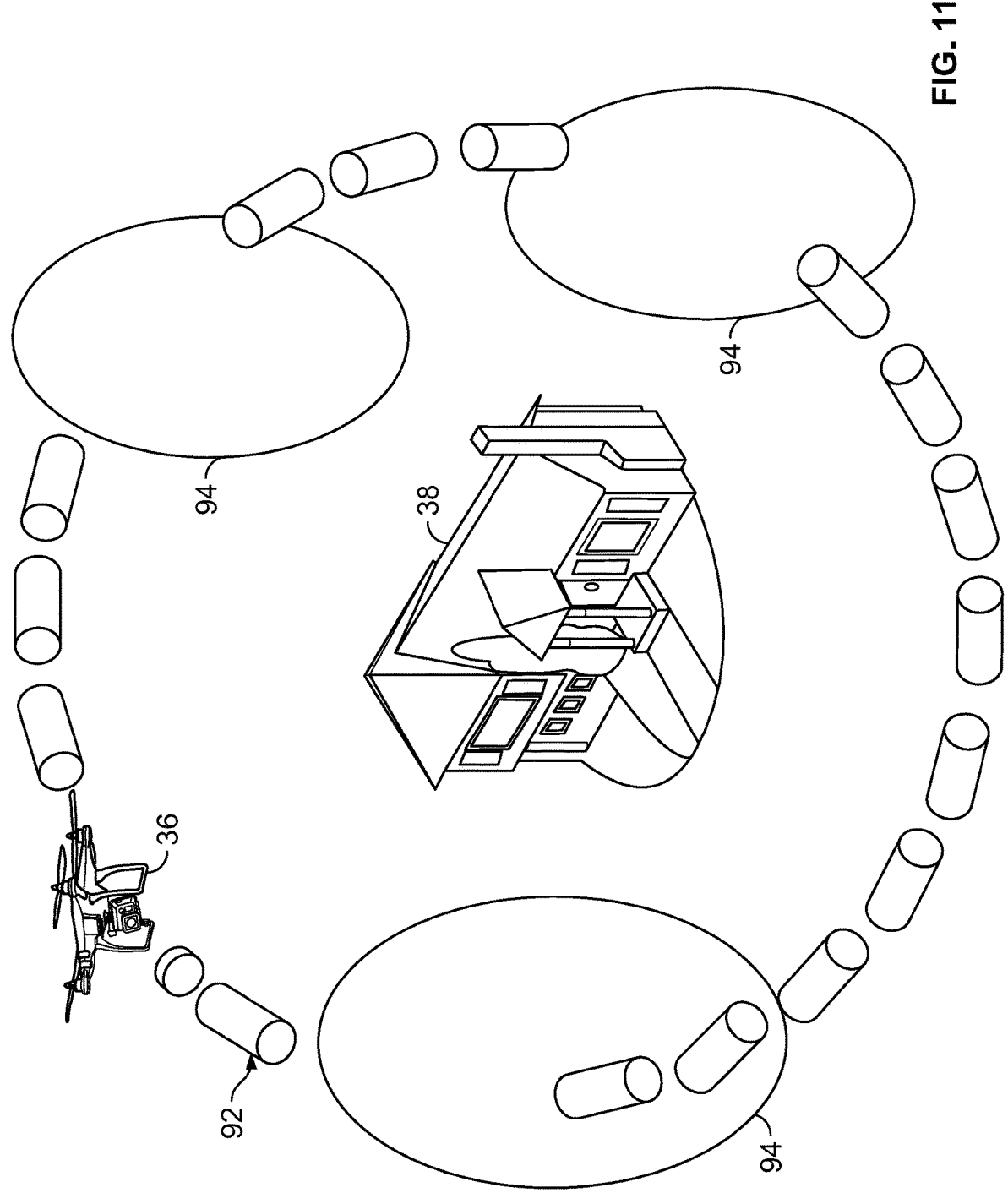
FIG. 11 is a diagram illustrating a flight path of a flight plan generated by the system according to step 70 of FIG. 8.

FIG. 11 is a diagram illustrating a flight path of a generated flight plan according to step 70 of FIG. 8. As noted above, in step 70, the system generates a geometric buffer 94 (as shown, an ellipsoid, although other shapes are possible) around each obstacle 90 present in the flight path. The geometric buffer 94 envelopes the entire obstacle 90 with an additional buffer to ensure the flight path avoids the obstacle 90. Then the system determines whether the flight path segment 88 affected by the intersection between the obstacle 90 present in the flight path and the cylinder 92 (or, section of a torus) along the flight path may be modified. If the system determines the flight segment 88 is modifiable, then the system in step 76 removes all flight path segments 88 between an entry point into the geometric buffer 94 and an exit point out of the geometric buffer 94.

Figure 12:
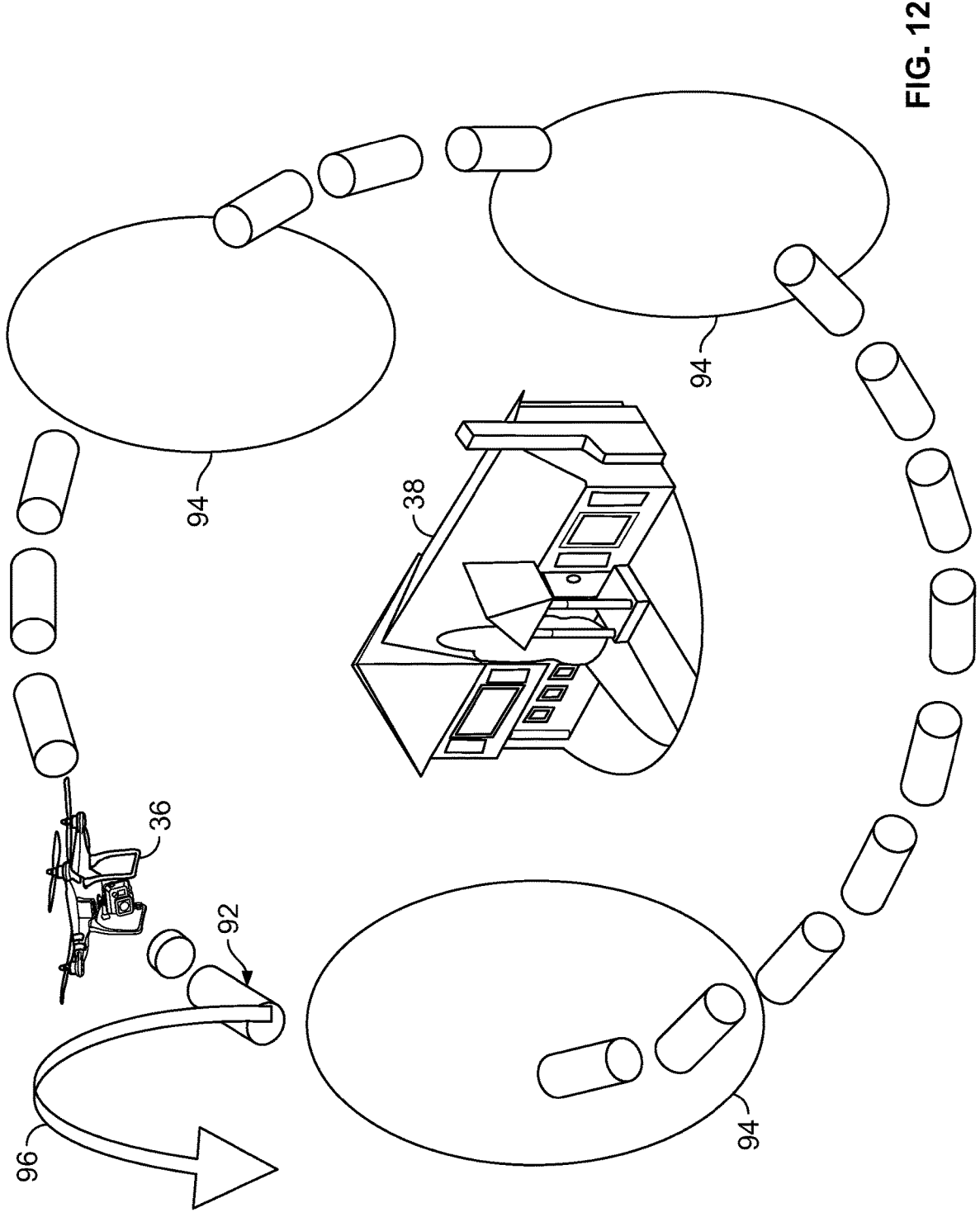
FIG. 12 is a diagram illustrating a flight path of a flight plan generated by the system according to steps 80a and 82a of FIG. 8.

FIG. 12 is a diagram illustrating a flight path of a generated flight plan according to steps 80*a* and 82*a* of FIG. 8. If the system determines a height of the geometric buffer 94 does not exceed a predefined threshold, then the system in step 80*a* calculates a vertical parabolic segment 96 over the geometric buffer 94 along the flight path. Accordingly, the system in step 82*a* then adds the calculated vertical parabolic segment 96 over the geometric buffer 94 to the flight path.

Figure 13:
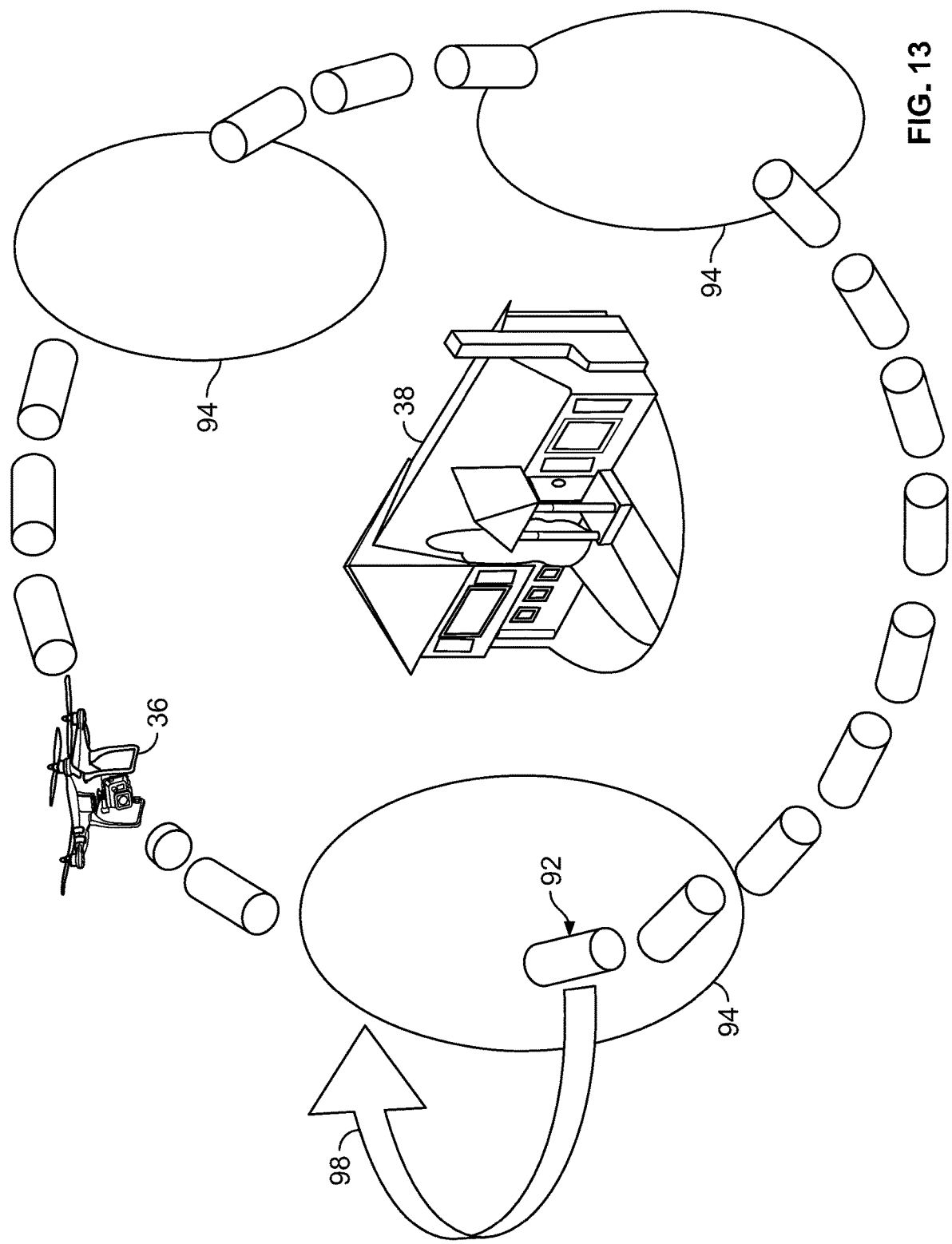
FIG. 13 is a diagram illustrating a flight path of a flight plan generated by the system according to steps 80b and 82b of FIG. 8.

FIG. 13 is a diagram illustrating a flight path of a generated flight plan according to steps 80*b* and 82*b* of FIG. 8. Alternatively, if the system determines the height of the geometric buffer 94 exceeds the predefined threshold, in step 80*b* the system calculates a horizontal parabolic segment 98 around the geometric buffer 94 along the flight path. The horizontal parabolic segment 98 around the geometric buffer 94 is calculated based on the intersection of the plane of the initial flight path and the geometric buffer 94. Therefore, the horizontal parabolic segment 98 around the geometric buffer 94 should go around the geometric buffer 94. Accordingly, the system in step 82*b* then adds the calculated horizontal parabolic segment 98 around the ellipsoid 94 to the flight path.

Figure 14:
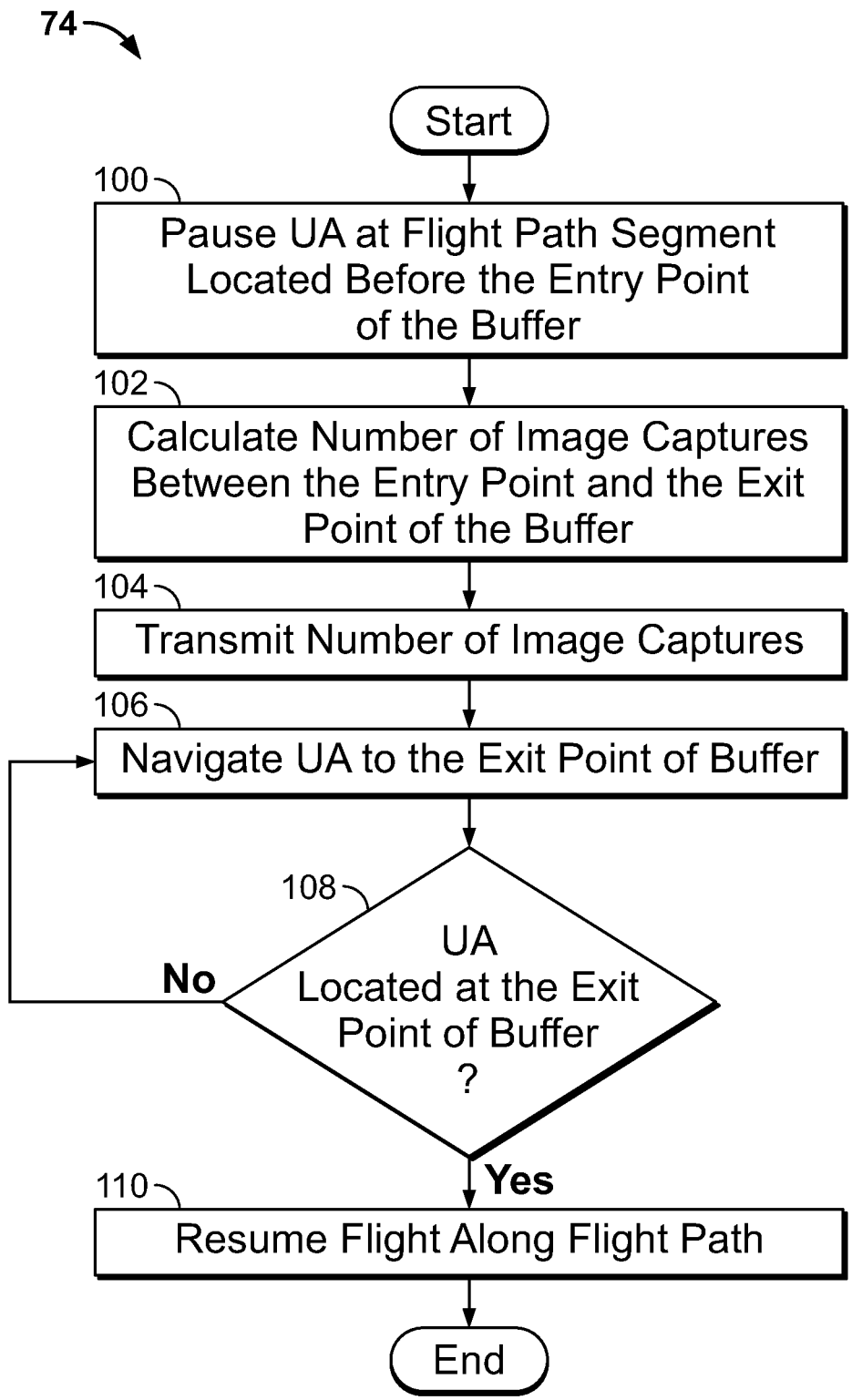
FIG. 14 is a flowchart illustrating step 74 of FIG. 8 in greater detail.

FIG. 14 is a flowchart illustrating step 74 of FIG. 8 in greater detail. A flight segment may not be automatically modifiable if the obstacle is too tall or large for the unmanned aircraft 36 to effectively avoid. Accordingly, in step 74 the system may enter a manual flight mode such that the flight path will include a manual section of flight directed by a user of the system (e.g. a pilot). In step 100, the unmanned aircraft 36 will pause at a flight path segment located before an entry point of the geometric buffer 94. In step 102, the system calculates a number of images to be captured between the flight path segment located before the entry point of the geometric buffer 94 and an exit point of the geometric buffer 94 (i.e., a resumption point). Therefore, the system calculates a number of images that should be captured between the pause point of unmanned aircraft 36 and a point at which the system will resume control of the unmanned aircraft 36. The system, in step 104, transmits the number of images to be captured to the user of the system.

In step 106, the user navigates the unmanned aircraft 36 to the resumption point. While navigating the unmanned aircraft 36, the system may assist the user by providing updates relating to absolute, horizontal and vertical distance. Additionally, the system may provide an update regarding an orientation of the resumption point relative to the position of the unmanned aircraft 36. In step 108, the system determines whether the unmanned aircraft 36 has arrived at the resumption point. If the system determines the unmanned aircraft 36 has not arrived at the resumption point, the user maintains control of the unmanned aircraft 36 and continues to navigate the unmanned aircraft 36 until arriving at the resumption point. In step 110, if the unmanned aircraft 36 arrives at the resumption point, the system resumes control of the unmanned aircraft 36 and resumes flight along the flight path of the flight plan. For example, the system may notify the user that the system is ready to resume control of the unmanned aircraft 36 and in response the unmanned aircraft 36 may hover in place until the user commands the system to resume the flight plan.

Figure 15:
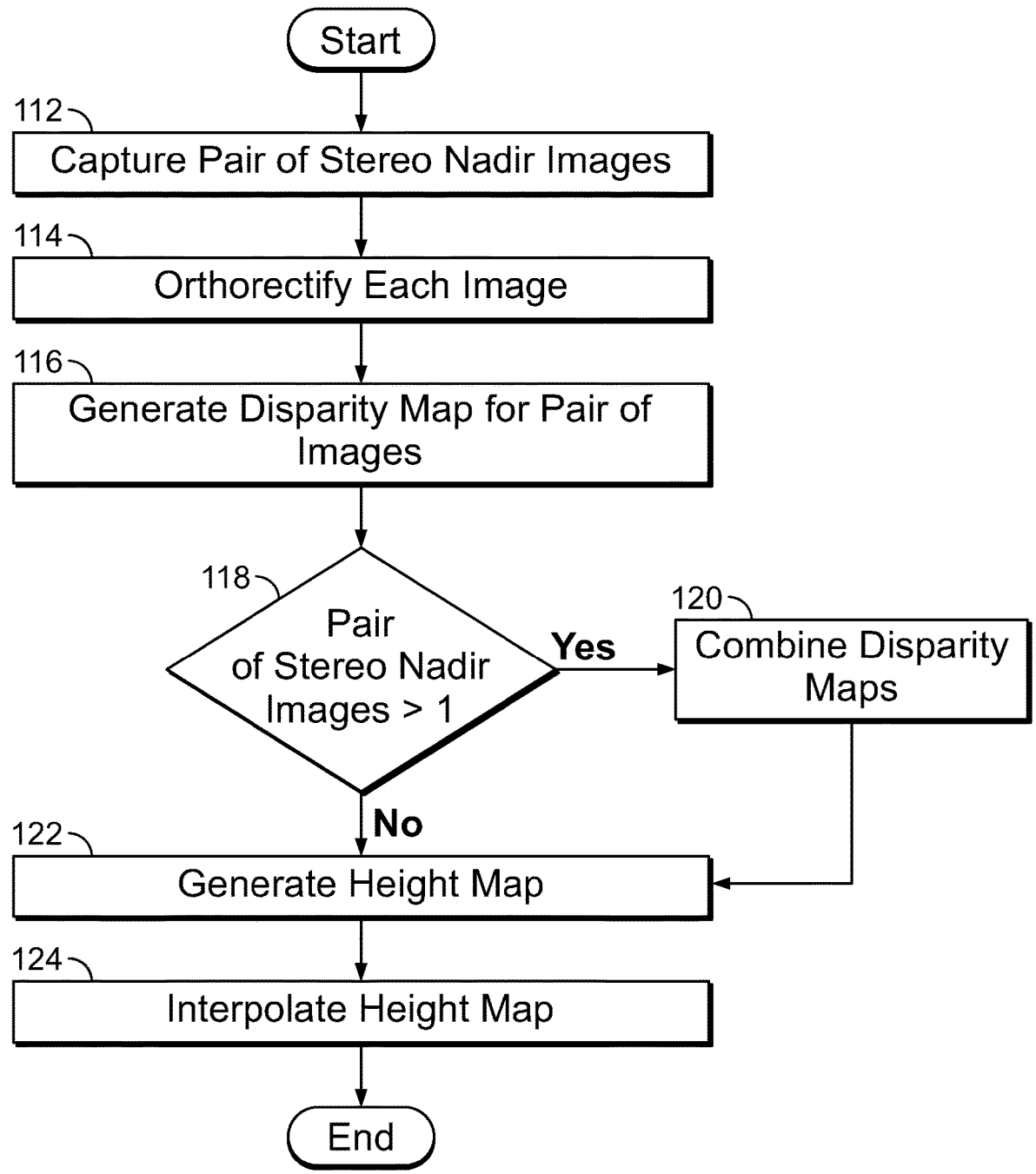
FIG. 15 is a flowchart illustrating processing steps carried out by the real time aerial map generator 10a of FIG. 1.

FIG. 15 is a flowchart illustrating the processing steps carried out by the real time aerial map generator 10*a* of FIG. 1. As discussed above, the system may download an aerial image data package of the area to be captured. The data package could be a pre-existing digital terrain model (DTM) including, but not limited to, flight path obstacles such as residential and commercial buildings, flagpoles, water towers, windmills, street lamps, trees, power lines, etc.

Alternatively, the real time aerial map generator 10*a* could generate a real time DTM. The real time generation of a DTM is advantageous because pre-existing DTMs may be outdated which may lead to inefficiencies when generating a flight plan and comparing the flight plan against the DTM. For example, natural disasters such as floods, fires, earthquakes, tornadoes, hurricanes and the like may change the natural topography of the capture area and/or destroy the flight path obstacles located within the capture area. In another example, rapid development of a capture area due to gentrification or the discovery of natural resources could result in the sudden existence or construction of flight path obstacles such as cranes, skyscrapers, oil rigs, etc.

Beginning in step 112, the system captures at least one pair of stereo nadir images. The number of stereo pairs required may depend on a size of the capture area and a height at which the stereo nadir images are captured. It may be advantageous to capture the at least one pair of stereo nadir images at a lower elevation to ensure a higher resolution of the images captured and as such that obstacles are accurately detected and dimensioned. Additionally, stereo nadir image pairs may be chained together such that a single image may be used in several stereo pairs. In step 114, the system orthorectifies each image, based on the field of view of a camera attached to the unmanned aircraft 36 and distortion parameters of the camera, to correct each image due to lens distortion. Then in step, 116 the system will generate a disparity map for each pair of stereo nadir images.

In step 118, the system determines whether the number of pairs of stereo nadir images is greater than one. If the system determines the number of pairs of stereo nadir images is greater than one, then the system in step 120 combines the disparity maps of each stereo pair into a single disparity map. Subsequently, the system generates a height map in step 122, based on the single disparity map, by triangulating each point in the disparity map using a location of the unmanned aircraft 36 and at least one view vector of the unmanned aircraft 36. The system or an external server may generate the height map based on available processing speed.

Alternatively, if the system determines the number of pairs of stereo is not greater than one, then the system proceeds to step 122 and generates a height map as discussed above. The generated height map in step 122 may be used as a DTM. However and as shown in FIG. 15, the system may interpolate the height map in step 124 into other formats for expedited processing. For example, the system could process intersections of an exemplary flight path with a mesh or collection of geometries more quickly than with the height map or point cloud.

Figure 16:
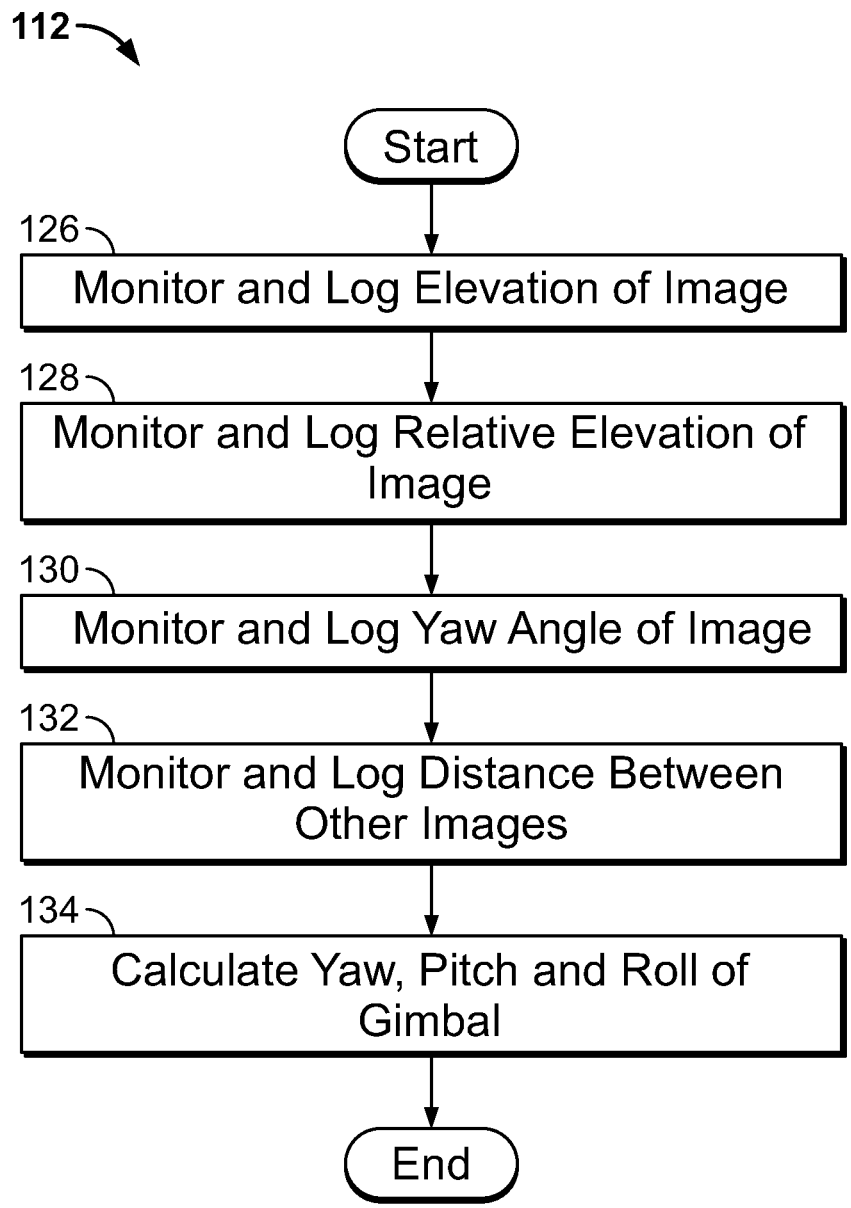
FIG. 16 is a flowchart illustrating step 112 of FIG. 15 in greater detail.

FIG. 16 is a flowchart illustrating step 112 of FIG. 15 in greater detail. The system captures at least one pair of stereo nadir images and monitors and logs parameters of each image while capturing the at least one pair of stereo nadir images. Beginning in step 126, the system monitors and logs an elevation of an image. In step 128, the system monitors and logs a relative elevation of the image in comparison to other images. Then in step 130 a yaw angle of the image is monitored and logged before a distance between the image and other images is monitored and logged in step 132. Lastly, in step 134, the system calculates a yaw angle, pitch and roll of the gimbal.

Figure 17:
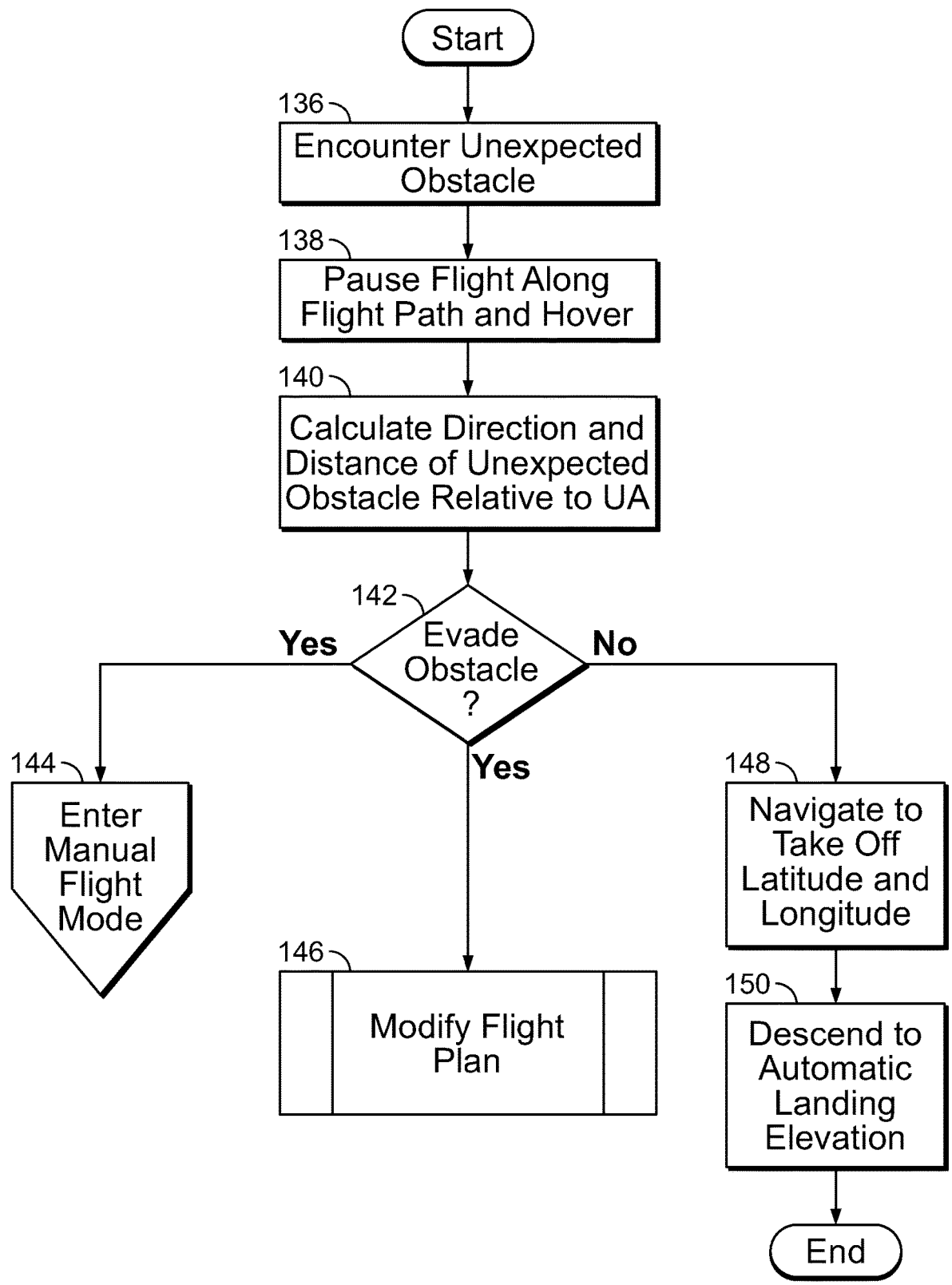
FIG. 17 is a flowchart illustrating processing steps carried out by the dynamic flight plan modification module 16c of FIG. 1 in greater detail.

FIG. 17 is a flowchart illustrating processing steps carried out by the dynamic flight plan modification module 16c of FIG. 1 in greater detail. Despite efforts to provide the system with an accurate DTM of the capture area, the unmanned aircraft 36 may encounter unexpected obstacles. Alternatively, a DTM of the capture area may not be available or one may not have the resources to generate a real time DTM. In the above cases, the system may provide for the unmanned aircraft 36 to dynamically evade obstacles present in a flight path by monitoring at least one sensor of the unmanned aircraft 36 along a flight path of a flight plan.

Beginning in step 136, the unmanned aircraft 36 encounters an unexpected obstacle. Accordingly, in step 138 the unmanned aircraft 36 will pause flight along the flight path and hover. Additionally, the system may notify a user of the system of the unexpected obstacle. Subsequently, the system in step 140 will query the at least one sensor of the unmanned aircraft 36 to calculate a direction and distance of the unexpected obstacle relative to the unmanned aircraft 36. Based on the calculation, the system will provide the user with options for evading the unexpected obstacle or an option to abort the flight plan.

For example, in step 144 the user may elect to evade the obstacle by assuming manual flight control of the unmanned aircraft 36 as discussed above in reference to FIG. 7. In step 146 the user may also elect to evade the obstacle by modifying the flight plan as discussed below in reference to FIGS. 18A-18B. Alternatively, the user may elect to abort the flight plan by navigating to the take off latitude and longitude in step 148 and descending to an automatic land elevation in step 150.

Figure 18A:
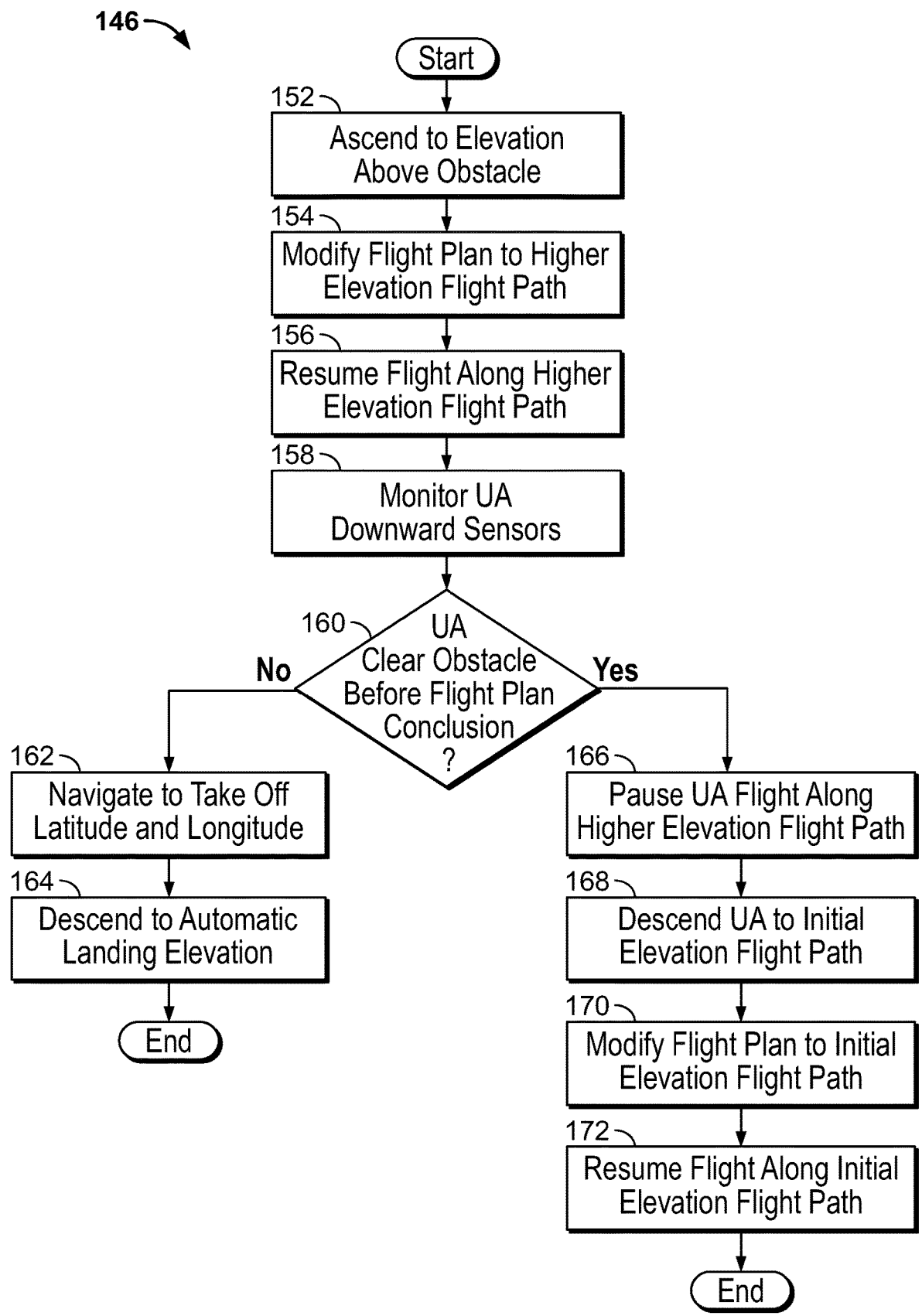
FIG. 18A is a flowchart illustrating step 146 of FIG. 17 in greater detail.

FIG. 18A is a flowchart illustrating step 146 of FIG. 17 in greater detail. The user may elect to evade the unexpected obstacle by navigating over the obstacle. Accordingly, in step 152 the system may slowly ascend the unmanned aircraft 36 to an elevation above the obstacle. Upon arriving at the higher elevation, the system in step 154 modifies the flight to plan to correspond to the higher elevation flight path. In step 156, the system resumes flight along the higher elevation flight path.

As shown in step 158, while resuming flight the system monitors at least one downward sensor of the unmanned aircraft 36 to detect when the unmanned aircraft 36 may return to the initial flight path elevation. If the system determines in step 160 that the unmanned aircraft 36 has not cleared the obstacle before a conclusion of the flight plan, the system will navigate the unmanned aircraft 36 to the take off latitude and longitude in step 162 and descend the unmanned aircraft 36 to an automatic landing elevation in step 164. Alternatively, if the system determines the unmanned aircraft 36 has cleared the obstacle before the conclusion of the flight plan, the system will execute a procedure to return the unmanned aircraft 36 to the initial elevation of the flight path. In step 166, the system will pause the flight of the unmanned aircraft 36 along the higher elevation flight path before descending the unmanned aircraft 36 to the initial elevation flight path in step 168. Subsequently, in step 170 the system will modify the flight plan to correspond to the initial elevation flight path and will resume flight of the unmanned aircraft 36 along the initial elevation flight path in step 172.

Figure 18B:
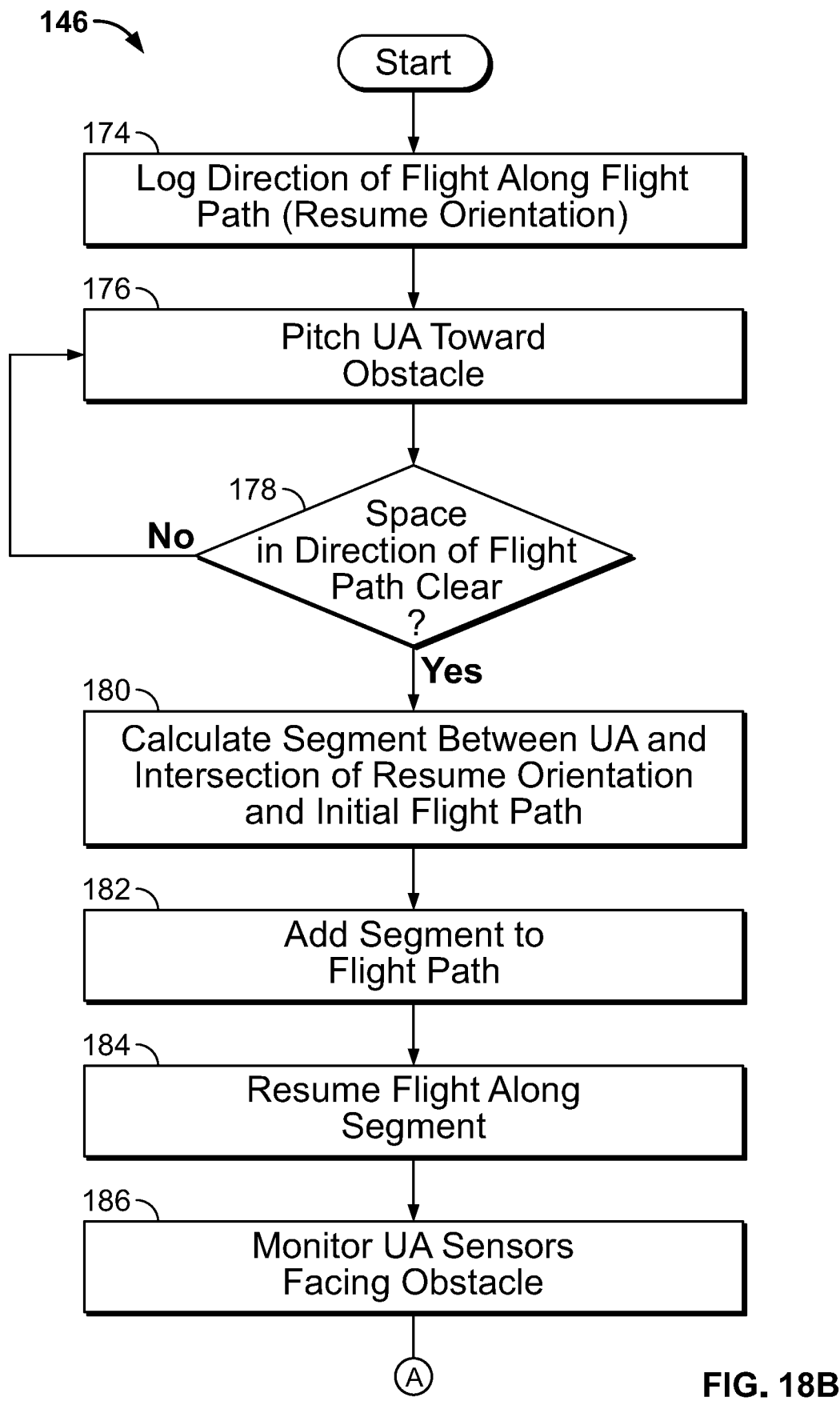
FIG. 18B is a flowchart illustrating step 146 of FIG. 17 in greater detail.
Figure 18B:
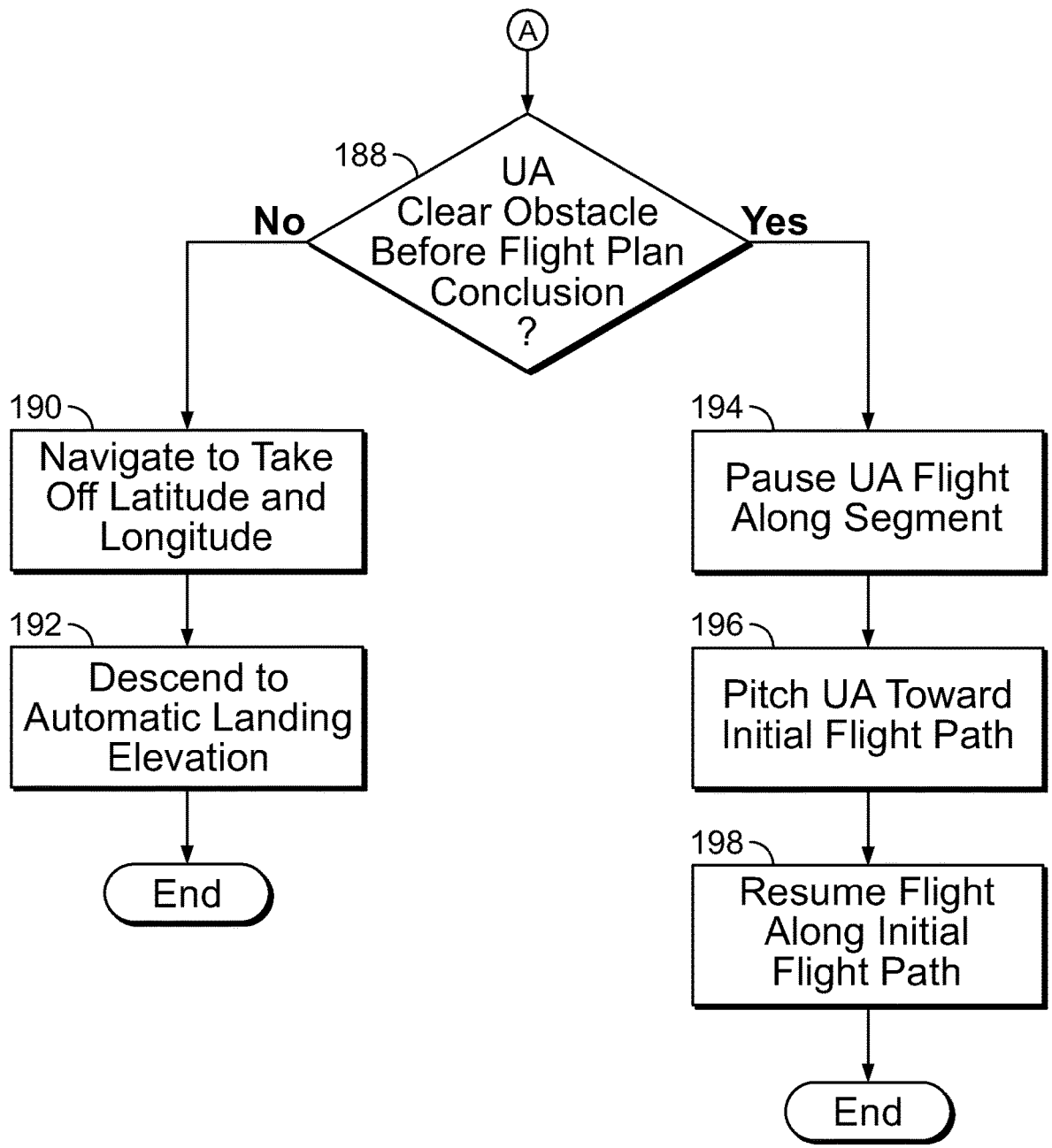

FIG. 18B is a flowchart illustrating step 146 of FIG. 17 in greater detail. The user may elect to evade the unexpected obstacle by navigating around the obstacle. Beginning in step 174, the system logs a direction of flight of the unmanned aircraft 36 along the flight path (i.e., the resume orientation). Then, the system, in step 176, pitches the unmanned aircraft 36 toward the obstacle until the space in the direction of the flight path is clear. If the space in the direction of the flight path is not clear in step 178, the system continues to pitch the unmanned aircraft 36 toward the obstacle. Otherwise, the system proceeds to step 180 and calculates a segment between the unmanned aircraft 36 and an intersection of the resume orientation and the initial flight path. In step 182, the system adds the calculated segment to the flight path and in step 184 the unmanned aircraft 36 resumes flight along the added segment.

As shown in step 186, while resuming flight the system monitors at least one sensor of the unmanned aircraft 36 facing the obstacle to detect when the unmanned aircraft 36 may return to the initial flight path. If the system determines the unmanned aircraft 36 has not cleared the obstacle before a conclusion of the flight plan, the system will navigate the unmanned aircraft 36 to the take off latitude and longitude in step 190 and descend the unmanned aircraft 36 to an automatic land elevation in step 192. Alternatively, if the system determines the unmanned aircraft 36 has cleared the obstacle before the conclusion of the flight plan, the system will execute a procedure to return the unmanned aircraft 36 to the initial flight path. In step 194, the system will pause the flight of the unmanned aircraft 36 along the added segment before pitching the unmanned aircraft 36 toward the initial flight path in step 196. Subsequently, in step 198 the system will resume flight of the unmanned aircraft 36 along the initial flight path.

Figure 19:
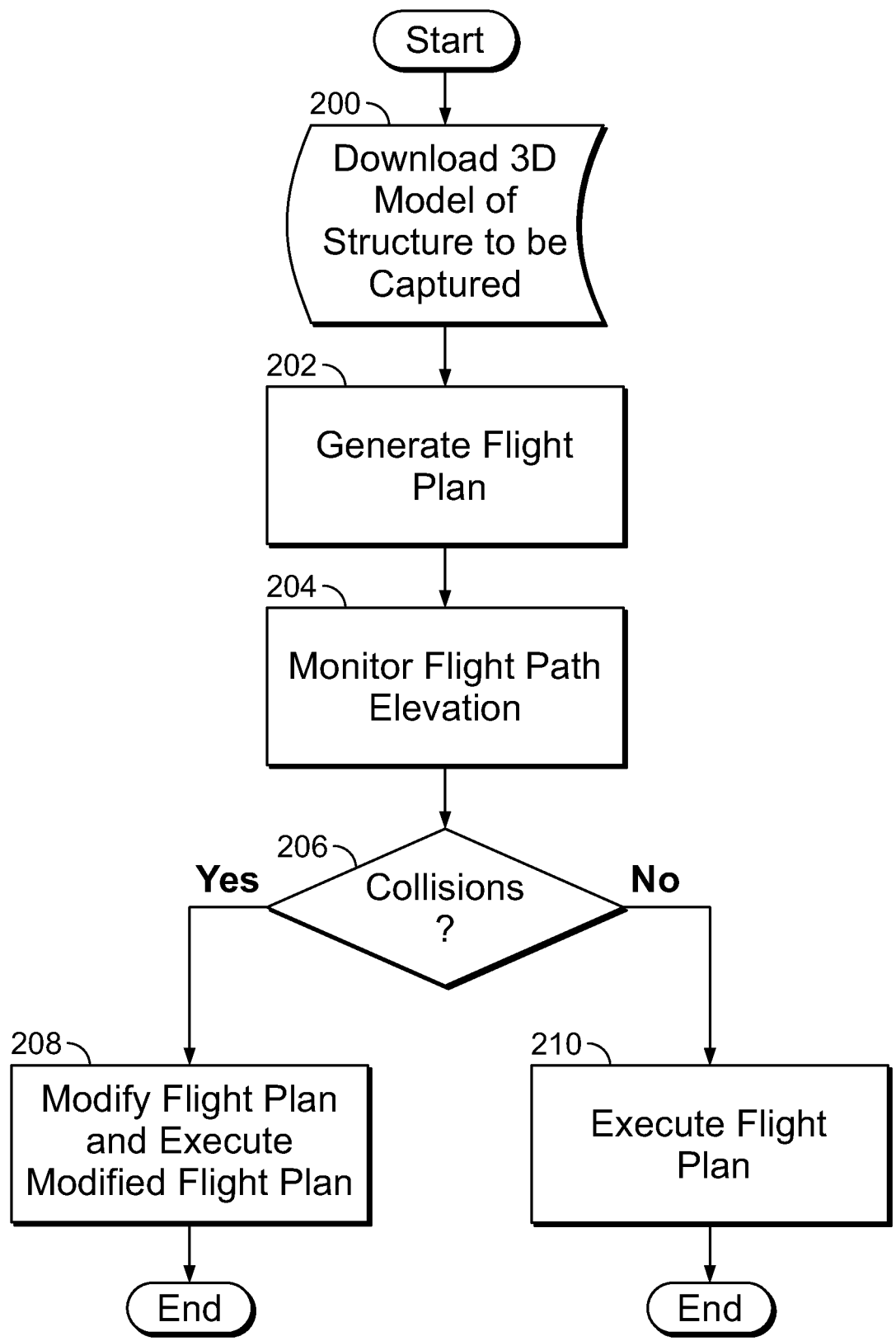
FIG. 19 is a flowchart illustrating processing steps carried out by the system according to another embodiment of the present disclosure.

FIG. 19 is a flowchart illustrating processing steps carried out by the unmanned aircraft 36 system according to another embodiment of the present disclosure. In this embodiment, the system may generate and execute a flight plan having a flight path as proximate as possible to the structure to be captured to obtain a highest possible resolution of captured images while avoiding collisions between the unmanned aircraft 36 and obstacles in the capture area.

Referring to FIG. 19, in step 200 the system loads a 3D model of the structure to be captured with each target surface of the structure specified as a polygon. The 3D model may be generated by the system or a contour bounding geometry around the structure being captured may be drawn by a user on site. In step 202, the system generates a flight plan having a flight path to capture high resolution imagery of each surface of the structure (e.g., roof faces, wall surfaces, etc.) according to but not limited to a desired front and side overlap ratio, image orientation, desired resolution (pixels per inch), ceiling elevation and floor elevation. For example, the system generates an ideal flight plan having an ideal flight path for each surface of the structure according to the aforementioned inputs and chains the respective flight plans together.

In step 204, the system monitors the flight path elevation by monitoring at least one downward facing sensor of the unmanned aircraft 36 for changes in relative elevation between the unmanned aircraft 36 and the structure. In step 206, the system checks for possible collisions between the unmanned aircraft 36 and the obstacles in the capture area based on changes in the relative elevation. If the system determines there are collision in step 206, then in step 208 the system modifies the initial flight plan by ascending or descending the unmanned aircraft 36 accordingly to maintain the highest possible image resolution and executes the modified flight plan to avoid obstacles while capturing the images. Additionally, if the unmanned aircraft 36 is equipped with an adjustable zoom lens, the system may adjust the zoom lens along the flight path to maintain the desired image resolution. If the system determines there are no collisions in step 206, then in step 210 the system executes the initial flight plan.

The system of the present disclosure could also include functionality for dynamically navigating around objects, in real time as the unmanned aircraft 36 is in flight. For example, the system could classify a nearby object (such as a tree, power line, etc.), and based on the classification, the system could navigate the unmanned aircraft 36 a predefined distance away from the object. Indeed, for example, the system could navigate the unmanned aircraft 36 a predefined distance of 20 feet away from an object if the object is classified as a power line, and another distance (e.g., 10 feet) away from an object if the object is classified as a tree. Such a system could implement machine learning techniques, such that the system learns how to classify objects over time and as a result, automatically determines what distances should be utilized based on classifications of objects. Still further, the system could detect unexpected objects (such as birds, other aircraft, etc.) and could navigate the unmanned aircraft away from such objects in real time.

Having thus described the present disclosure in detail, it is to be understood that the foregoing description is not intended to limit the spirit or scope thereof. What is desired to be protected is set forth in the following claims.

What is claimed is:

1. A system for flight planning for an unmanned aircraft, comprising:
an unmanned aircraft; and
a processor in communication with the unmanned aircraft, the processor:
generating an aerial imagery map;
identifying at least one object in the aerial imagery map as at least one flight path obstacle if the at least one object intersects a three-dimensional region defined around at least a portion of a potential flight path of the unmanned aircraft;
generating at least one geometric buffer around the at least one flight path obstacle;
generating a flight plan including at least one flight path segment that avoids intersecting the geometric buffer around the at least one flight path obstacle; and
executing the generated flight plan.

2. The system of claim 1, wherein the processor receives an aerial imagery data package of the capture area from a database, the aerial image data package being a pre-existing digital terrain model.

3. The system of claim 1, wherein the processor is a personal computer, a laptop computer, a tablet computer, a smart telephone, a server or a cloud-based computing platform.

4. The system of claim 1, wherein the generated flight plan is based on a field of view of a camera attached to the unmanned aircraft, a height of the feature to be captured, and a footprint of the feature to be captured.

5. The system of claim 1, wherein the processor causes the unmanned aircraft to:
ascend to a nadir view elevation;
navigate to and capture at least one nadir view;
navigate to and capture connecting images;
navigate to and capture at least one oblique view;
navigate to a take off latitude and longitude; and
descend to an automatic landing elevation.

6. The system of claim 5, wherein the processor:
determines an amount of connecting images to be captured to provide contiguous overlapping images as the unmanned aircraft moves along the generated flight plan; and
determines an amount of oblique views to be captured to provide coverage of the feature.

7. The system of claim 1, wherein the processor modifies the at least one flight path segment based on a buffer height associated with the at least one obstacle.

8. The system of claim 7, wherein the processor:
  determines a vertical parabolic flight path over the obstacle when the buffer height associated with the obstacle is more than a threshold;
  adds the determined vertical parabolic flight path segment to the flight plan;
  determines an amount of image captures along the added vertical parabolic segment; and
  determines and sets a pitch of a gimbal for each image capture.

9. The system of claim 7, wherein the processor:
  determines a horizontal parabolic flight path around the obstacle when the buffer height associated with the obstacle is less than a threshold;
  adds the determined horizontal parabolic flight path segment to the flight plan;
  determines an amount of image captures along the added horizontal parabolic segment; and
  determines and sets a pitch of a gimbal for each image capture.

10. The system of claim 1, wherein the processor:
  monitors at least one sensor of the unmanned aircraft;
  determines, based on the monitoring, whether the unmanned aircraft encounters an unexpected obstacle along the flight plan; and
  controls, based on the determination, the unmanned aircraft to evade the unexpected obstacle.

11. A method for mission planning and flight automation for an unmanned aircraft comprising the steps of:
  generating an aerial imagery map;
  identifying at least one object in the aerial imagery map as at least one flight path obstacle if the at least one object intersects a three-dimensional region defined around at least a portion of a potential flight path of the unmanned aircraft;
  generating at least one geometric buffer around the at least one flight path obstacle;
  generating a flight plan including at least one flight path segment that avoids intersecting the geometric buffer around the at least one flight path obstacle; and
  executing the generated flight plan to control the unmanned aircraft.

12. The method of claim 11, further comprising receiving an aerial imagery data package of the capture area from a database, the aerial image data package being a pre-existing digital terrain model.

13. The method of claim 11, wherein the processor is a personal computer, a laptop computer, a tablet computer, a smart telephone, a server or a cloud-based computing platform.

14. The method of claim 11, wherein the generated flight plan is based on a field of view of a camera attached to the unmanned aircraft, a height of the feature to be captured, and a footprint of the feature to be captured.

15. The method of claim 11, further comprising controlling the unmanned aircraft to:
  ascend to a nadir view elevation;
  navigate to and capture at least one nadir view;
  navigate to and capture connecting images;
  navigate to and capture at least one oblique view;
  navigate to a take off latitude and longitude; and
  descend to an automatic landing elevation.

16. The method of claim 15, further comprising:
  determining an amount of connecting images to be captured to provide contiguous overlapping images as the unmanned aircraft moves along the generated flight plan; and
  determining an amount of oblique views to be captured to provide coverage of the feature.

17. The method of claim 11, further comprising modifying the at least one flight path segment based on a buffer height associated with the at least one obstacle.

18. The method of claim 17, further comprising:
  determining a vertical parabolic flight path over the obstacle when the buffer height associated with the obstacle is more than a threshold;
  adding the determined vertical parabolic flight path segment to the flight plan;
  determining an amount of image captures along the added vertical parabolic segment; and
  determining and setting a pitch of a gimbal for each image capture.

19. The method of claim 17, further comprising:
  determining a horizontal parabolic flight path around the obstacle when the buffer height associated with the obstacle is less than a threshold;
  adding the determined horizontal parabolic flight path segment to the flight plan;
  determining an amount of image captures along the added horizontal parabolic segment; and
  determining and setting a pitch of a gimbal for each image capture.

20. The method of claim 11, further comprising:
  monitoring at least one sensor of the unmanned aircraft;
  determining, based on the monitoring, whether the unmanned aircraft encounters an unexpected obstacle along the flight plan; and
  controlling, based on the determination, the unmanned aircraft to evade the unexpected obstacle.

* * * * *